United States Patent
Yeo et al.

(10) Patent No.: US 11,742,992 B2
(45) Date of Patent: Aug. 29, 2023

(54) METHOD AND DEVICE FOR TRANSMITTING OR RECEIVING HARQ-ACK FEEDBACK IN WIRELESS COMMUNICATION SYSTEM

(71) Applicant: Samsung Electronics Co., Ltd., Suwon-si (KR)

(72) Inventors: Jeongho Yeo, Suwon-si (KR); Hyunseok Ryu, Suwon-si (KR); Sungjin Park, Suwon-si (KR); Jonghyun Bang, Suwon-si (KR); Heecheol Yang, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 17/266,938

(22) PCT Filed: Aug. 2, 2019

(86) PCT No.: PCT/KR2019/009662
§ 371 (c)(1),
(2) Date: Feb. 8, 2021

(87) PCT Pub. No.: WO2020/032490
PCT Pub. Date: Feb. 13, 2020

(65) Prior Publication Data
US 2021/0314100 A1    Oct. 7, 2021

(30) Foreign Application Priority Data
Aug. 10, 2018   (KR) .................. 10-2018-0094009

(51) Int. Cl.
*H04W 56/00*    (2009.01)
*H04L 1/1812*   (2023.01)
(Continued)

(52) U.S. Cl.
CPC ......... *H04L 1/1819* (2013.01); *H04B 7/0417* (2013.01); *H04B 7/0456* (2013.01);
(Continued)

(58) Field of Classification Search
CPC .... H04L 1/1819; H04L 1/1896; H04W 72/23; H04W 8/24; H04W 72/0446; H04W 72/0453; H04B 7/00417; H04B 7/0456
See application file for complete search history.

(56) References Cited

U.S. PATENT DOCUMENTS 10,341,057 B2    7/2019   Shen
10,735,170 B2    8/2020   Yang et al.
(Continued)

FOREIGN PATENT DOCUMENTS

KR    10-2018-0031014 A    3/2018
KR    10-2019-0117290 A    10/2019
WO    2016/021957 A1      2/2016

OTHER PUBLICATIONS

ASUSTek, "Discussion about semi-static codebook", 3GPP TSG RAN WG1 Meeting #93, May 21-25, 2018, R1-1807241, 5 pages.
(Continued)

*Primary Examiner* — Sai Ming Chan

(57) ABSTRACT

Provided is a method of transmitting, by a terminal, a hybrid automatic repeat request-acknowledgement (HARQ-ACK) codebook, the method including: obtaining HARQ-ACK feedback timing information and resource allocation information of a physical downlink shared channel (PDSCH); determining a number of PDSCHs that the terminal is to receive in one slot; determining an HARQ-ACK feedback bit to be included in an HARQ-ACK codebook, based on the HARQ-ACK feedback timing information and the resource allocation information of the PDSCH and information about the number of PDSCHs that the terminal is to receive in one
(Continued)

slot; and transmitting the HARQ-ACK codebook including the determined HARQ-ACK feedback bit.

20 Claims, 8 Drawing Sheets

(51) Int. Cl.
    *H04B 7/0417*     (2017.01)
    *H04B 7/0456*     (2017.01)
    *H04L 1/1867*     (2023.01)
    *H04W 8/24*     (2009.01)
    *H04W 72/0446*     (2023.01)
    *H04W 72/0453*     (2023.01)
    *H04W 72/23*     (2023.01)

(52) U.S. Cl.
    CPC ............ *H04L 1/1896* (2013.01); *H04W 8/24* (2013.01); *H04W 72/0446* (2013.01); *H04W 72/0453* (2013.01); *H04W 72/23* (2023.01)

(56) References Cited

U.S. PATENT DOCUMENTS

2017/0366305 A1* 12/2017 Hwang ................ H04L 5/0055
2019/0037586 A1*  1/2019 Park .................... H04L 1/0026
2020/0389258 A1* 12/2020 Lei ...................... H04L 1/1854
2021/0184801 A1*  6/2021 El Hamss ........... H04L 1/1854
2021/0203451 A1*  7/2021 Lei ...................... H04L 1/1819

OTHER PUBLICATIONS

LG Electronics, "URLLC aspects on DL/UL scheduling and HARQ management", 3GPP TSG RAN WG1 Meeting 93, May 21-25, 2018, R1-1806626,6 pages.

Wilus Inc., "Remaining Issues on HARQ-ACK codebook construction", 3GPP TSG RAN WG1 Meeting #93, May 21-25, 2018, R1-1807236, 5 pages.

International Search Report dated Nov. 15, 2019 in connection with International Patent Application No. PCT/KR2019/009662, 2 pages.

Written Opinion of the International Searching Authority dated Nov. 15, 2019 in connection with International Patent Application No. PCT/KR2019/009662, 5 pages.

* cited by examiner

METHOD AND DEVICE FOR TRANSMITTING OR RECEIVING HARQ-ACK FEEDBACK IN WIRELESS COMMUNICATION SYSTEM

CROSS-REFERENCE TO RELATED APPLICATIONS

This application is a 371 of International Application No. PCT/KR2019/009662 filed on Aug. 2, 2019, which claims priority to Korean Patent Application No. 10-2018-0094009 filed on Aug. 10, 2018, the disclosures of which are herein incorporated by reference in their entireties.

BACKGROUND

1. Field

The present disclosure relates to a wireless communication system, and more particularly, to methods and apparatuses for transmitting hybrid automatic repeat request-acknowledgement (HARQ-ACK) feedback for downlink data transmission.

2. Description of Related Art

To meet increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post Long Term Evolution (post-LTE)' systems.

To achieve high data rates, implementation of 5G communication systems in an ultra-highfrequency or millimeter-wave (mmWave) band (e.g., a 60 GHz band) is being considered. To reduce path loss of radio waves and increase a transmission distance of radio waves in the ultra-high frequency hand for 5G communication systems, various technologies such as beamforming, massive multiple-input and multiple-output (massive MIMO), full-dimension MIMO (FD-MIMO), array antennas, analog beamforming, and large-scale antennas are being studied.

To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technologies including beamforming, MIMO, array antennas, and the like. Application of cloud RAN as the above-described big data processing technology may be an example of convergence of 5G communication technology and IoT technology.

As various services can be provided according to the foregoing and the development of wireless communication systems, methods for smoothly providing such services are required.

In disclosed embodiments, apparatuses and methods capable of effectively providing services in a mobile communication system are provided.

SUMMARY

In disclosed embodiments, methods of efficiently transmitting a hybrid automatic repeat request-acknowledgement (HARQ-ACK) codebook are provided.

According to the disclosed embodiments, services may be effectively provided in a mobile communication system.

DETAILED DESCRIPTION

Figure 1:
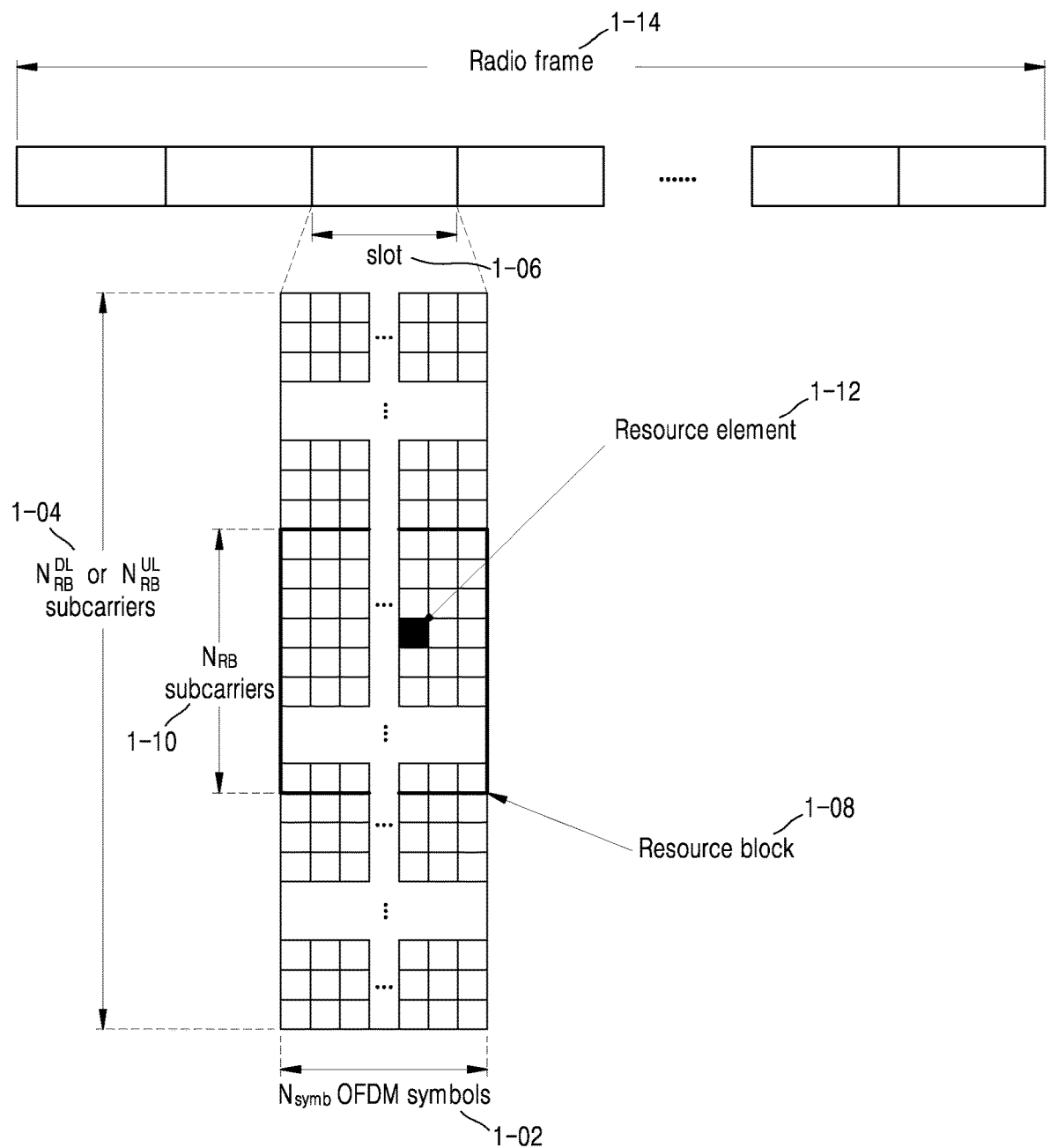
FIG. 1 is a diagram illustrating a time-frequency domain structure for downlink or uplink transmission of a new radio (NR) system, according to some embodiments of the present disclosure.

According to an embodiment of the present disclosure, a method of transmitting, by a terminal, a hybrid automatic repeat request-acknowledgement (HARQ-ACK) codebook includes: obtaining HARQ-ACK feedback timing information and resource allocation information of a physical downlink shared channel (PDSCH); determining, a number of PDSCHs that the terminal is to receive in one slot; determining an HARQ-ACK feedback bit to be included in an HARQ-ACK codebook, based on the HARQ-ACK feedback timing information and the resource allocation information of the PDSCH and information about the number of PDSCHs that the terminal is to receive in one slot; and transmitting the HARQ-ACK codebook including the determined HARQ-ACK feedback bit.

The determining of the HARQ-ACK feedback bit may include determining a number of HARQ-ACK feedback bits to be included in the HARQ-ACK codebook.

The obtaining of the HARQ-ACK feedback timing information and the resource allocation information of the PDSCH may include determining the maximum number of PDSCHs that are to be scheduled in one slot, based on the HARQ-ACK feedback timing information and the resource allocation information of the PDSCH.

The determining of the HARQ-ACK feedback bit may include: determining a maximum number of PDSCHs that are to be scheduled in the one slot, as a number of bits to be included in the HARQ-ACK codebook; and determining, as a negative acknowledgement (NAM), other HARQ-ACK feedback bits other than HARQ-ACK feedback bits corresponding to the number of PDSCHs that the terminal is to receive in one slot, which are to be included in the HARQ-ACK codebook.

The method may further include receiving the PDSCH based on the resource allocation information of the PDSCH.

The determining of the HARQ-ACK feedback bit may include, when the PDSCH includes a plurality of transport blocks (TBs), determining a plurality of HARQ-ACK feedback bits respectively corresponding to a plurality of TBs to be included in the HARQ-ACK codebook.

The method may further include receiving the PDSCH based on the resource allocation information of the PDSCH.

The determining of the HARQ-ACK feedback bit to be included in the HARQ-ACK codebook may include, when the PDSCH includes a plurality of transport blocks (TBs) and spatial bundling is configured, determining one HARQ-ACK feedback bit to be included in the HARQ-ACK codebook, the one HARQ-ACK feedback bit corresponding to a plurality of TBs included in one PDSCH.

The HARQ-ACK feedback timing information may be determined based on a minimum processing time required to transmit an HARQ-ACK after receiving a PDSCH of the terminal.

The minimum processing time may be determined based on at least one of information about whether HARQ-ACK feedback information is transmitted on a physical uplink control channel (PUCCH) or a physical uplink shared channel (PUSCH), processing capability information of the terminal, information about whether HARQ-ACK feedback information and certain uplink control information (UCI) are transmitted together, and information about a PDSCH mapping type.

According to another embodiment of the present disclosure, a method of receiving, by a base station, a hybrid automatic repeat request-acknowledgement (HARQ-ACK) codebook includes: transmitting HARQ-ACK feedback timing information and resource allocation information of a physical downlink shared channel (PDSCH) to a terminal; receiving, from the terminal, information about a number of PDSCHs that the terminal is to receive in one slot; determining an HARQ-ACK feedback bit to be included in an HARQ-ACK codebook, based on the HARQ-ACK feedback timing information and the resource allocation information of the PDSCH and information about the number of PDSCHs that the terminal is to receive in one slot; and receiving a HARQ-ACK codebook including at least one HARQ-ACK feedback bit from the terminal, based on a result of the determining.

The received HARQ-ACK codebook may include a number of HARQ-ACK feedback bits corresponding to the number of PDSCHs that the terminal is to receive in one slot.

The HARQ-ACK feedback timing information may be determined based on a minimum processing time required to transmit an HARQ-ACK after receiving a PDSCH of the terminal.

The minimum processing time may be determined based on at least one of information about whether HARQ-ACK feedback information is transmitted on a physical uplink control channel (PUCCH) or a physical uplink shared channel (PUSCH), processing capability information of the terminal, information about whether HARQ-ACK feedback information and certain uplink control information (UCI) are transmitted together, and information about a PDSCH mapping type.

The method may further include transmitting an uplink scheduling grant (uplink grant (UL grant)) to the terminal.

The uplink scheduling grant may include uplink data transmission timing information, and the uplink data transmission timing information may be determined by a minimum processing time required for the terminal to receive the UL grant and transmit a PUSCH.

The minimum processing time may be determined based on at least one of information about a bandwidth part change delay time of the terminal, information about whether HARQ-ACK feedback information is transmitted on a PUSCH, processing capability information of the terminal, and information about whether HARQ-ACK feedback information and certain UCI are transmitted together.

According to another embodiment of the present disclosure, a terminal for transmitting a hybrid automatic repeat request-acknowledgement (HARQ-ACK) codebook includes: a transceiver; and at least one controller combined with the transceiver and configured to obtain HARQ-ACK feedback timing information and resource allocation information of a physical downlink shared channel (PDSCH), determine a number of PDSCHs that the terminal is to receive in one slot, determine an HARQ-ACK feedback bit to be included in the HARQ-ACK codebook, based on the HARQ-ACK feedback timing information and the resource allocation information of the PDSCH and information about the number of PDSCHs that the terminal is to receive in one slot, and transmit an HARQ-ACK codebook including the determined HAN-ACK feedback bit.

The at least one controller may be further configured to determine a number of HARQ-ACK feedback bits to be included in the HARQ-ACK codebook.

According to another embodiment of the present disclosure, a base station for receiving a hybrid automatic repeat request-acknowledgement (HARQ-ACK) codebook includes: a transceiver; and at least one controller combined with the transceiver and configured to transmit HARQ-ACK feedback timing information and resource allocation information of a physical downlink shared channel (PDSCH) to a terminal, receive, from the terminal, information about a number of PDSCHs that the terminal is to receive in one slot, determine an HARQ-ACK feedback bit to be included in an HARQ-ACK codebook, based on the HARQ-ACK feedback timing information and the resource allocation information of the PDSCH and information about the number of PDSCHs that the terminal is to receive in one slot, and receive a HARQ-ACK codebook including at least one HARQ-ACK feedback bit from the terminal, based on a result of the determining.

The HARQ-ACK feedback timing information may be determined based on a minimum processing time required to transmit an HARQ-ACK after receiving a PDSCH of the terminal, and the minimum processing time may be determined based on at least one of information about whether HARQ-ACK feedback information is transmitted on a physical uplink control channel (PUCCH) or a physical uplink shared channel (PUSCH), processing capability information of the terminal, information about whether HARQ-ACK feedback information and certain uplink control information (UCI) are transmitted together, and information about a PDSCH mapping type.

The at least one controller may be further configured to transmit an uplink scheduling grant (uplink grant (UL grant)) to the terminal, the uplink scheduling grant may include uplink data transmission timing information, and the uplink data transmission timing information may be determined by a minimum processing time required for the terminal to receive the UL grant and transmit a PUSCH.

The minimum processing time may be determined based on at least one of information about a bandwidth part change delay time of the terminal, information about whether HARQ-ACK feedback information is transmitted on a PUSCH, processing capability information of the terminal, and information about whether HARQ-ACK feedback information and certain UCI are transmitted together.

To meet increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post Long Term Evolution. (post-LTE)' systems. A 5G communication system defined in the 3GPP is called a new radio (NR) system. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas have been studied and applied to the NR system. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multipoints (COMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SOMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication, and network infrastructure, service interface technology, and security technology are required and, in recent years, technologies related to sensor networks for connecting objects, machine-to-machine (M2M) communication, and machine-type communication (MTC) have been studied. In the loT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the loT network. For example, technologies related to sensor networks, M2M communication, and MTC are being implemented by using 5G communication technology including beamforming, MIMO, and array antennas. Application of cloud RAN as the above-described big data processing technology may be an example of convergence of 5G communication technology and IoT technology.

Moreover, in NR access technology that is new 5G communication, it is designed to allow various services to be freely multiplexed in time and frequency resources, and accordingly, waveform/numerology, reference signals, and the like may be dynamically or freely allocated according to the need of the service. In wireless communication, in order to provide an optimal service to a terminal, optimized data transmission through measurement of channel quality and interference amount may be important, and accordingly, accurate channel state measurement may be essential. However, unlike in 4G communication in which channel and interference characteristics do not change significantly depending on frequency resources, in the case of 5G channels, because channel and interference characteristics change significantly depending on services, it may be necessary to support a subset of a frequency resource group (FRG) dimension that allows the channel and interference characteristics to be separately measured. Moreover, in the NR system, the types of supported services may be classified into categories such as enhanced mobile broadband (eMBB), massive machine-type communication (mMTC), and ultra-reliable and low-latency communication (URLLC). The eMBB may be considered as a service aiming at high-speed transmission of high-capacity data, the mMTC may be considered as a service aiming at minimizing terminal power and accessing multiple terminals, and the URLLC may be considered as a service aiming at high reliability and low latency. Different requirements may be applied depending on the types of services applied to the terminal. However, the types of services supported in the NR system are not limited to thereto.

As such, a plurality of services may be provided to a user in a communication system, and in order to provide such a plurality of services to a user, a method of providing each service within the same time period according to characteristics and an apparatus using the same are required.

Hereinafter, embodiments of the present disclosure will be described in detail with reference to the accompanying drawings.

In describing the embodiments of the present disclosure, descriptions of technical contents that are well known in the technical field to which the present disclosure belongs and are not directly related to the present disclosure will be omitted. This is to more clearly convey the subject matter of the present disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

Advantages and features of the present disclosure and methods of achieving the same will be apparent from the embodiments of the present disclosure described below in detail with reference to the accompanying drawings. The present disclosure may, however, be embodied in many different forms and should not be construed as being limited to the embodiments of the present disclosure described below; rather, these embodiments of the present disclosure are provided to complete the present disclosure and fully convey the scope of the present disclosure to those of ordinary skill in the art and the present disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "~unit" used in the present embodiments may refer to a software component or a hardware component such as a field programmable gate array (FPGA) or an application specific integrated circuit (ARC) and the "~unit" may perform certain functions. However, the "~unit" is not limited to software or hardware. The "~unit" may be configured to be in an addressable storage medium or may be configured to operate one or more processors. Thus, as an example, the "~unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~units" may be associated with the smaller number of components and "~units" or may be further divided into additional components and "~units". In addition, the components and "~units" may be implemented to operate one or more central processing units (CPUs) in a device or a security multimedia card. Also, in embodiments, the "~unit" may include one or more processors.

Wireless communication systems providing voice-based services are being developed to broadband wireless communication systems providing high-speed and high-quality packet data services according to communication standards such as high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of the Institute of Electrical and Electronics Engineers (IEEE). Also, 5G or NR communication standards are being generated as $5^{th}$ veneration wireless communication systems.

As a typical example of a broadband wireless communication system, an NR system employs an orthogonal frequency division multiplexing (OFDM) scheme in a downlink (DL) and an uplink (UL). However, more particularly, a cyclic-prefix OFDM (CP-OFDM) scheme is employed in the downlink, and both a CP-OFDM scheme and a discrete Fourier transform spreading OFDM (DFT-S-OFDM) scheme are employed in the uplink. The uplink may refer to a radio link for transmitting data or control signals from a terminal (e.g., a user equipment (UE) or a mobile station (MS)) to a base station (e.g., a gNode B or a base station (BS)), and the downlink may refer to a radio link for transmitting data or control signals from the base station to the terminal. The above-described multiple access schemes may generally distinguish between data or control information of different users by allocating and operating time-frequency resources for the data or control information of the users not to overlap each other, that is, to achieve orthogonality therebetween.

The NR system employs a hybrid automatic repeat request (HARQ) scheme in which a physical layer retransmits corresponding data when a decoding failure occurs in initial transmission. In the HARQ scheme, when a receiver fails to accurately decode data, the receiver may transmit information (negative acknowledgement (HACK)) for notifying a decoding failure to a transmitter such that the transmitter may retransmit the data in a physical layer. The receiver may improve data reception performance by combining the data retransmitted by the transmitter with the data that has previously failed to be decoded. Also, when a receiver succeeds in accurately decoding data, the receiver may transmit information (acknowledgement (ACK)) for notifying a decoding success to a transmitter such that the transmitter may transmit new data.

In the following disclosure, a method and apparatus for transmitting HARQ-ACK feedback for downlink data transmission will be described. Particularly, a method of configuring HARQ-ACK feedback bits when a terminal intends to transmit an HARQ-ACK on an uplink will be described.

In a wireless communication system, particularly an NR system, a base station may configure one component carrier (CC) or a plurality of component carriers for downlink transmission to a terminal. Also, downlink transmission and uplink transmission slots and symbols may be configured in each CC. Moreover, when physical downlink shared channel (PDSCH) that is downlink data is scheduled, at least one of information of slot timing to which the PDSCH is mapped in a particular bit field of downlink control information (DCI), information about the position of a start symbol to which the PDSCH is mapped in the slot, and information about the number of symbols to which the PDSCH is mapped may be transmitted. For example, when DCI is transmitted in slot n and PDSCH is scheduled, when K0 that is information of slot timing through which the PDSCH is transmitted indicates 0, a start symbol position is 0, and a symbol length is 7, the PDSCH may be mapped and transmitted in 7 symbols from the $0^{th}$ symbol of slot n. On the one hand, a PDSCH that is a downlink data signal may be transmitted, and HARQ-ACK feedback may be transmitted from the terminal to the base station after a K1 slot. K1 information that is timing information for transmitting the HARQ-ACK may be transmitted in the DCI, and a candidate set of K1 possible values may be transmitted through upper-level signaling and it may be determined as one of them in the DCI.

When the terminal is configured with a semi-static HARQ-ACK codebook, a feedback bit to be transmitted may be determined by a table including slot information to which the PDSCH is mapped, start symbol information, and/or symbol number or length information, and K1 candidate values that are HARQ-ACK feedback timing information for the PDSCH. A table including slot information to which the PDSCH is mapped, start symbol information, and/or symbol number or length information may have a default value, and there may also be a table that the base station may configure to the terminal. In the present disclosure, a method and apparatus for configuring an HARQ-ACK codebook according to how many PDSCHs for unicasting the terminal may receive in one slot are provided.

Also, in the following disclosure, a method of calculating, by the terminal, a minimum processing time for HARQ-ACK feedback or uplink transmission will be described.

Also, in the following disclosure, a method of determining power in uplink transmission will be described in detail.

FIG. 1 is a diagram illustrating a basic structure of a time-frequency domain that is a radio resource domain in which data or control channels are transmitted on a downlink or an uplink in an NR system, according to some embodiments of the present disclosure.

In FIG. 1, a horizontal axis represents a time domain, and a vertical axis represents a frequency domain. A minimum transmission unit in the time domain may be an OFDM symbol, and $N_{symb}$ OFDM symbols 1-02 may be collected to form one slot 1-06. The length of a subframe may be defined as 1.0 ms, and a radio frame 1-14 may be defined as 10 ms. A minimum transmission unit in the frequency domain may be a subcarrier, and the bandwidth of an entire system transmission band (transmission bandwidth) may include a total of $N_{BW}$ subcarriers 1-04.

The basic unit of a resource in the time-frequency domain may be a resource element (RE) 1-12 and may be represented by an OFDM symbol index and a subcarrier index. A resource block (RB) 1-08 (or a physical resource block (PRB)) may be defined by $N_{symb}$ consecutive OFDM symbols 1-02 in the time domain and $N_{RB}$ consecutive subcarriers 1-10 in the frequency domain. Thus, one RB 1-08 may include $N_{symb} \times N_{RB}$ REs 1-12. In general, the minimum transmission unit of data may be an RB unit. In the NR system, $N_{symb}=14$, $N_{RB}=12$, and $N_{BW}$ and $N_{RB}$ may be proportional to the bandwidth of the system transmission band. However, the present disclosure is not limited thereto.

According to some embodiments, a data rate may increase in proportion to the number of RBs scheduled to the terminal. In the NR system, in the case of a frequency division duplex (FDD) system in which the downlink and the uplink are divided into frequencies, the downlink transmission bandwidth and the uplink transmission bandwidth may be different from each other. The channel bandwidth may represent the radio frequency (RF) bandwidth corresponding to the system transmission bandwidth. Tables 1 and 2 show some of the correspondence between the system transmission bandwidth, the subcarrier spacing, and the channel bandwidth defined in the NR system in a frequency band lower than 6 GHz and a frequency band higher than 6 GHz, respectively. For example, in the NR system having a 100 MHz channel bandwidth with a 30 kHz subcarrier spacing, the transmission bandwidth may include 273 RBs. Hereinafter, N/A may be a bandwidth-subcarrier combination that is not supported by the NR system.

TABLE 1

| Channel bandwidth $BW_{Channel}$ [MMz] | Subcarrier spacing | 5 | 10 | 20 | 50 | 80 | 100 |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth $BW_{Channel}$ [MHz] | Subcarrier spacing | 50 | 100 | 20 | 50 |
|---|---|---|---|---|---|
| Transmission bandwidth configuration $N_{RB}$ | 60 kHz | 66 | 132 | 264 | N/A |
| | 120 kHz | 32 | 66 | 132 | 204 |

In the NR system, scheduling information about downlink data or uplink data may be transmitted from the base station to the terminal through downlink control information (DCI). The DCI may be defined according to various formats and may represent, depending on each format, whether it is scheduling information about uplink data (UL grant) or scheduling information about downlink data (DL grant), whether it is compact DCI with a small size of control information, whether spatial multiplexing using multiple antennas is applied, whether it is DCI for power control, or the like. For example, DCI format 1-1 that is scheduling control information about downlink data (DL grant) may include at least one of the following control information. However, the present disclosure is not limited to the following example.

Carrier indicator: Indicates on which frequency carrier it is transmitted.

DCI format indicator: An indicator indicating whether the DCI is for downlink or uplink.

Bandwidth part (BWP) indicator: Indicates in which BWP it is transmitted.

Frequency domain resource allocation: Indicates the RB of the frequency domain allocated for data transmission. The represented resource is determined according to the system bandwidth and the resource allocation method.

Time domain resource allocation: Indicates in which OFDM symbol of which slot a data related channel is to be transmitted.

VRB-to-PRB mapping: Indicates how to map a virtual RB (VRB) index and a physical RB (PRB) index.

Modulation and coding scheme (MCS): Indicates the modulation scheme used for data transmission and the size of a transport block that is data to be transmitted.

HARQ process number: Indicates the process number of HARQ.

New data indicator: Indicates whether it is HARQ initial transmission or retransmission.

Redundancy version: Indicates the redundancy version of HARQ.

Transmit power control (TPC) command for physical uplink control channel (PUCCH): Indicates a transmission power control command for PUCCH that is an uplink control channel.

In the case of PUSCH transmission, time domain resource allocation (or assignment) may be transmitted by information about a slot in which PUSCH is transmitted and a start symbol position S in the slot, and the number of symbols L to which the PUSCH is mapped. S may be a relative position from the start of the slot, L may be the number of consecutive symbols, and S and L may be determined from a start and length indicator value (SLIV) defined as below.

if $(L-1) \le 7$ then $SLIV = 14 \cdot (L-1) + S$ else $SLIV = 14 \cdot (14-L+1) + (14-1-S)$ where $0 < L \le 14-S$ Also, according to some embodiments, in the NR system, a table including information about an SLAT value, a PUSCH mapping type, and a slot in which PUSCH is transmitted, in one row may be configured through RRC configuration. Thereafter, in time domain resource allocation of DCI, by indicating an index value in the configured table, the base station may, transmit information about the SLIV value, the PUSCH mapping type, and the slot in which the PUSCH is transmitted, to the terminal.

According to some embodiments, in the NR system, a type A and a type B may be defined as the PUSCH mapping type. In the PUSCH mapping type A, the first symbol among the DMRS symbols may be located in the second or third OFDM symbol in the slot. In the PUSCH mapping type B, the first symbol among the DMRS symbols may be located in the first OFDM symbol in the time domain resource allocated for PUSCH transmission.

The DCI may be transmitted on a physical downlink control channel (PDCCH) (or control information, which will be interchangeably used hereinafter), which is a downlink physical control channel, through a channel coding and modulation process.

The DCI may be independently scrambled by a particular radio network temporary identifier (INTI) (or a terminal identifier) for each terminal, added with a cyclic redundancy check (CRC), channel-coded, and then each configured and transmitted as an independent PDCCH. The PDCCH may be mapped and transmitted in a control resource set (CORESET) configured to the terminal.

The downlink data may be transmitted on a physical downlink shared channel (PDSCH) that is a physical channel for downlink data transmission. The PDSCH may be transmitted after the control channel transmission period, and scheduling information such as a particular mapping position in the frequency domain and a modulation scheme may be determined based on the DCI transmitted through the PDCCH.

Through the MCS among the control information constituting the DCI, the base station may notify the terminal of the modulation scheme applied to the PDSCH to be transmitted and the size of data to be transmitted (a transport block size (TBS)). According to some embodiments, the MCS may include 5 bits or more or fewer bits. The TBS may correspond to the size before channel coding for error correction is applied to data (a transport block (TB)) to be transmitted by the base station.

According to some embodiments of the present disclosure, a transport block (TB) that is data to be transmitted may include at least one of a medium access control (MAC) header, a MAC control element (CE), one or more MAC service data unit (SDUs), and padding bits. Alternatively, the TB may refer to a MAC protocol data unit (PDD) or a unit of data provided from a MAC layer to a physical layer.

The modulation schemes supported by the NR system may be quadrature phase shift keying (QPSK), 16 quadrature amplitude modulation (16QAM), 64QAM, and 256QAM, and the respective modulation orders (Qm) thereof may correspond to 2, 4, 6, and 8. That is, 2 bits per symbol may be transmitted in the case of QPSK modulation, 4 bits per symbol may be transmitted in the case of 16QAM modulation, 6 bits per symbol may be transmitted in the case of 64QAM modulation, and 8 bits per symbol may be transmitted in the case of 256QAM modulation.

Figure 2:
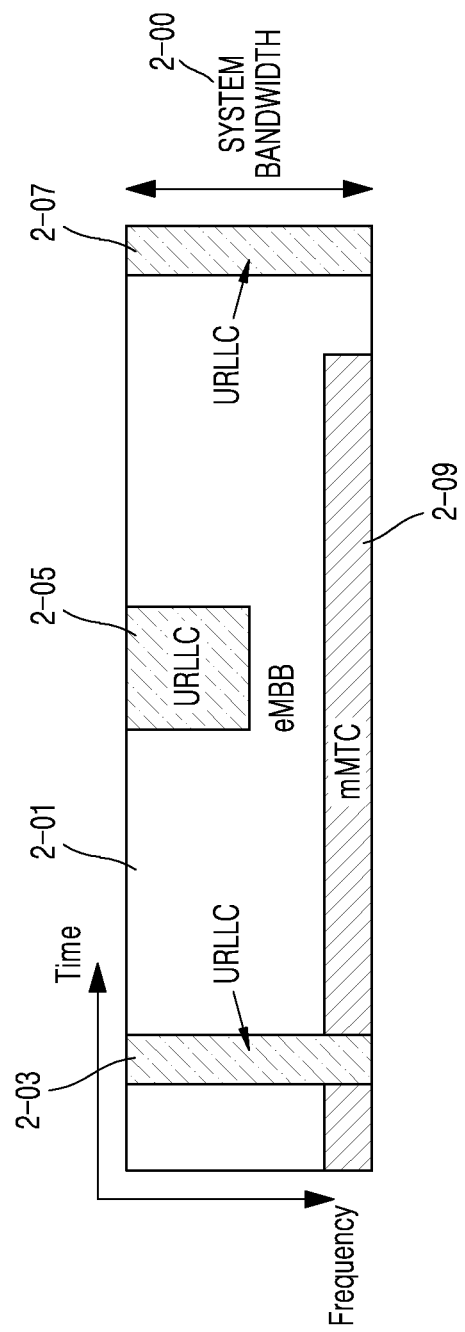
FIG. 2 is a diagram illustrating a state in which a plurality of pieces of data for enhanced mobile broadband (eMBB), ultra-reliable and low-latency communication (URLLC), and massive machine-type communication (mMTC) are allocated in frequency-time resources in a communication system, according to some embodiments of the present disclosure.
Figure 3:
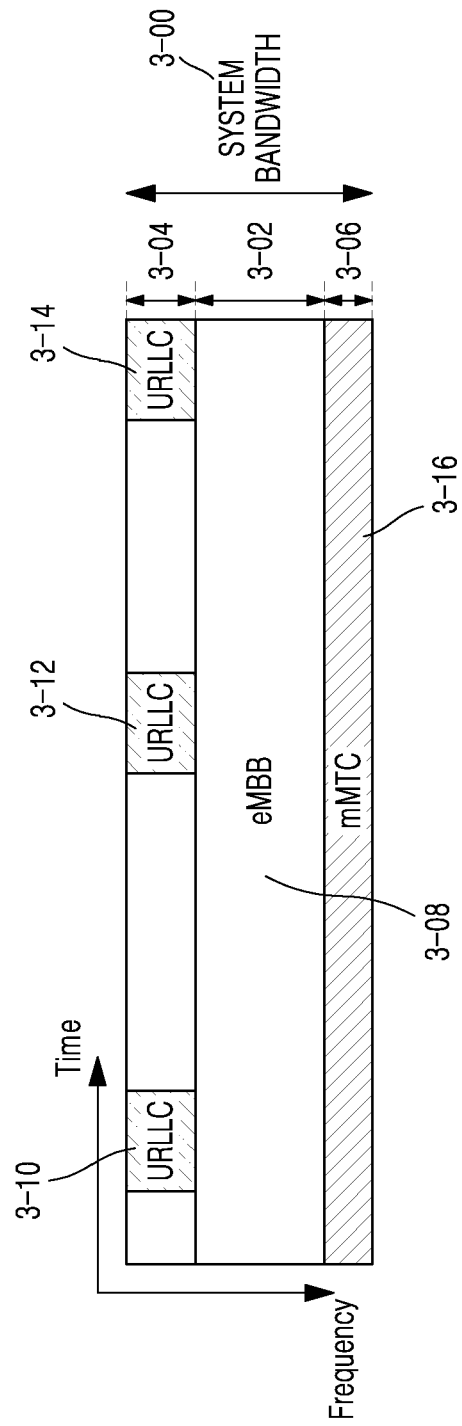
FIG. 3 is a diagram illustrating a state in which a plurality of pieces of data for eMBB, URLLC, and mMTC are allocated in frequency-time resources in a communication system, according to some embodiments of the present disclosure.

FIGS. 2 and 3 illustrate a state in which a plurality of pieces of data for eMBB, URLLC, and mMTC, which are services considered in 5G or NR systems, are allocated in frequency-time resources, according to some embodiments.

Referring to FIGS. 2 and 3, it may be seen how frequency and lime resources are allocated for information transmission in each system.

In FIG. 2, data for eMBB, URLLC, and mMTC may be allocated in an entire system frequency band 2-00. When transmission is required because URLLC data 2-03, 2-05, and 2-07 occurs while eMBB 2-01 and mMTC 2-09 are allocated and transmitted in a particular frequency band, the URLLC data 2-03, 2-05, and 2-07 may be transmitted by emptying or not transmitting portions where the eMBB 2-01 and the mMTC 2-09 have already been allocated. Because the URLLC among the services requires reduction of a delay time, the URLLC data 2-03, 2-05, and 2-07 may be allocated and transmitted in a portion of the resource to which the eMBB 2-01 is allocated. However, when URLLC is additionally allocated and transmitted in the resource to which eMBB is allocated, eMBB data may not be transmitted in the overlapping frequency-time resource and thus the transmission performance of eMBB data may be lowered. That is, in the case of FIG. 2, an eMBB data transmission failure may occur due to URLLC allocation.

In FIG. 3, an entire system frequency band 3-00 may be divided and a service and data may be transmitted in each of subbands 3-02, 3-04, and 3-06. Information related to subband configuration may be predetermined, and the information related to the subband configuration may be transmitted from the base station to the terminal through upper-level signaling. In addition, according to some embodiments, information related to the subband may be randomly divided by the base station or the network node to provide services without transmitting separate subband configuration information to the terminal. As illustrated in FIG. 3, the subband 3-02 may be used for eMBB data transmission, the subband 3-04 may be used for URLLC data transmission, and the subband 3-06 may be used for mMTC data transmission.

According to some embodiments, the length of a transmission time interval (TTI) used for URLLC transmission may be shorter than the length of a TTI used for eMBB or mMTC transmission. Also, the response of information related to URLLC may be transmitted faster than eMBB or mMTC, and accordingly, the information may be transmitted and received with low delay. Also, the structure of a physical layer channel used for each type to transmit the above three services or data may be different. For example, at least one of the length of a transmission time interval (TTI) of a physical layer channel, a frequency resource allocation unit, a control channel structure, and a data mapping method used for each type to transmit the above three services or data may be different.

However, the present disclosure is not limited to the above three services and three types of data, and more types of services and data corresponding thereto may exist and the content of the present disclosure may also be applied in this case.

Also, terms such as "physical channel" and "signal" in the NR system may be used to describe methods and apparatuses proposed in embodiments of the present disclosure. However, the content of the present disclosure may also be applied to wireless communication systems other than the NR system.

Hereinafter, embodiments of the present disclosure will be described in detail with the accompanying drawings. In the following description of the present disclosure, detailed descriptions of well-known functions or configurations will be omitted because they would unnecessarily obscure the subject matters of the present disclosure. Also, terms described below may be terms defined considering functions in the present disclosure and may vary according to users' or operators' intentions or practices. Therefore, the definition thereof should be made based on the content throughout the specification. Hereinafter, the base station may be an agent performing terminal resource allocation and may be at least one of a gNode B (gNB), an eNode (eNB) B, a Node B, a base station (BS), a radio access unit, a base station controller, or a node on a network. Examples of the terminal may include a user equipment (UE), a mobile station (MS), a cellular phone, a smartphone, a computer, or a multimedia system capable of performing a communication function. In the present disclosure, the downlink (DL) may refer to a wireless transmission path of a signal transmitted from the base station to the terminal, and the uplink (UL) may refer to a wireless transmission path of a signal transmitted from the terminal to the base station. Also, embodiments of the present disclosure will be described below by using the NR system as an example; however, embodiments of the present disclosure may also be applied to other communication systems having similar technical backgrounds or channel types. Also, embodiments of the present disclosure may also be applied to other communication systems through some modifications without departing from the scope of the present disclosure by the judgment of those of ordinary skill in the art.

In the present disclosure, the conventional terms "physical channel" and "signal" may be used interchangeably with data or control signals. For example; the PDSCH is a physical channel through which data is transmitted; however, in the present disclosure, the PDSCH may be referred to as data.

Hereinafter, in the present disclosure, upper-level signaling may be a method of transmitting a signal from the base station to the terminal by using a downlink data channel of the physical layer or from the terminal to the base station by using an uplink data channel of the physical layer and may also be referred to as radio resource control (RRC) signaling or MAC control element (CE).

The following embodiments provide methods and apparatuses for indicating and determining time domain resources in PUSCH scheduling when the terminal is before RRC connection with the base station or when the above table including information about a SLIV value, a PUSCH mapping type, and a slot in which PUSCH is transmitted, in one row, has failed to be configured by upper-level signaling.

In the present disclosure, when the terminal is before RRC connection with the base station or when the above table including information about a SLIV value, a PUSCH mapping type, and a slot in which PUSCH is transmitted, in one row, has failed to be configured by upper-level signaling, a table for interpreting an indicator indicating time domain resource information in PUSCH scheduling DCI may be referred to as a default table. Alternatively, the above method may be interchangeably referred to as a default time domain resource allocation method. For example, by defining the following tables and indicating a value of i that is a row index in Table 3 below, a PUSCH default time domain resource may be allocated to the terminal.

TABLE 3

| i | PUSCH mapping type | $K_2$ | S | L |
| --- | --- | --- | --- | --- |
| 0 | Type A | j | 0 | 14 |
| 1 | Type A | j | 0 | 12 |
| 2 | Type A | j | 0 | 10 |
| 3 | Type B | j | 2 | 12 |
| 4 | Type B | j | 2 | 10 |
| 5 | Type B | j | 2 | 8 |
| 6 | Type B | j | 4 | 10 |
| 7 | Type B | j | 4 | 8 |
| 8 | Type B | j | 4 | 6 |
| 9 | Type A | j + 1 | 0 | 14 |
| 10 | Type A | j + 1 | 0 | 12 |
| 11 | Type A | j + 1 | 0 | 10 |

TABLE 3-continued

| i | PUSCH mapping type | $K_2$ | S | L |
|---|---|---|---|---|
| 12 | Type A | j + 2 | 0 | 14 |
| 13 | Type A | j + 2 | 0 | 12 |
| 14 | Type A | j + 2 | 0 | 10 |

In Table 3, j may be defined differently according to the subcarrier spacing. For example, it may be defined as 1 at 15 kHz and 30 kHz, 2 at 60 kHz, and 3 at 120 kHz.

In Table 3, K2 may be defined as meaning that, when the DCI scheduling the PUSCH is transmitted in a certain slot, the PUSCH is transmitted in a slot after K2 therefrom. This may mean that the PUSCH is transmitted during L OFDM symbols from the $S^{th}$ OFDM symbol from the start of the slot in which the PUSCH is transmitted. For example, when a time domain resource indicator of the PUSCH to be transmitted at 30 kHz subcarrier spacing by using the above table indicates i=7 in the DCI, the terminal may use the PUSCH mapping type B in transmitting the PUSCH and may transmit the PUSCH during 8 OFDM symbols from the fourth OFDM symbol of the slot next to the slot in which the DCI is transmitted. However, in the above method, there may be a case where the terminal fails to transmit the PUSCH due to the minimum processing time of the terminal according to the S value or the position of the CORESET where the DCI is mapped. Thus, it may be necessary to define the above table or consider the minimum processing time and the timing advance in default time domain resource allocation.

In the NR system, the minimum processing time required for the terminal to receive the DCI and prepare to transmit the PUSCH may be defined as in Table 4 below.

TABLE 4

| Units | 15 KHz SCS | 30 KHz SCS | 60 KHz SCS | 120 KHz SCS |
|---|---|---|---|---|
| Symbols | 10 | 12 | 23 | 36 |

When data is mapped to some or all of the first symbol of the PUSCH, it may be assumed that the value of Table 4 is increased by 1. Also, the minimum processing time may be assumed differently according to the capability of the terminal.

Figure 4:
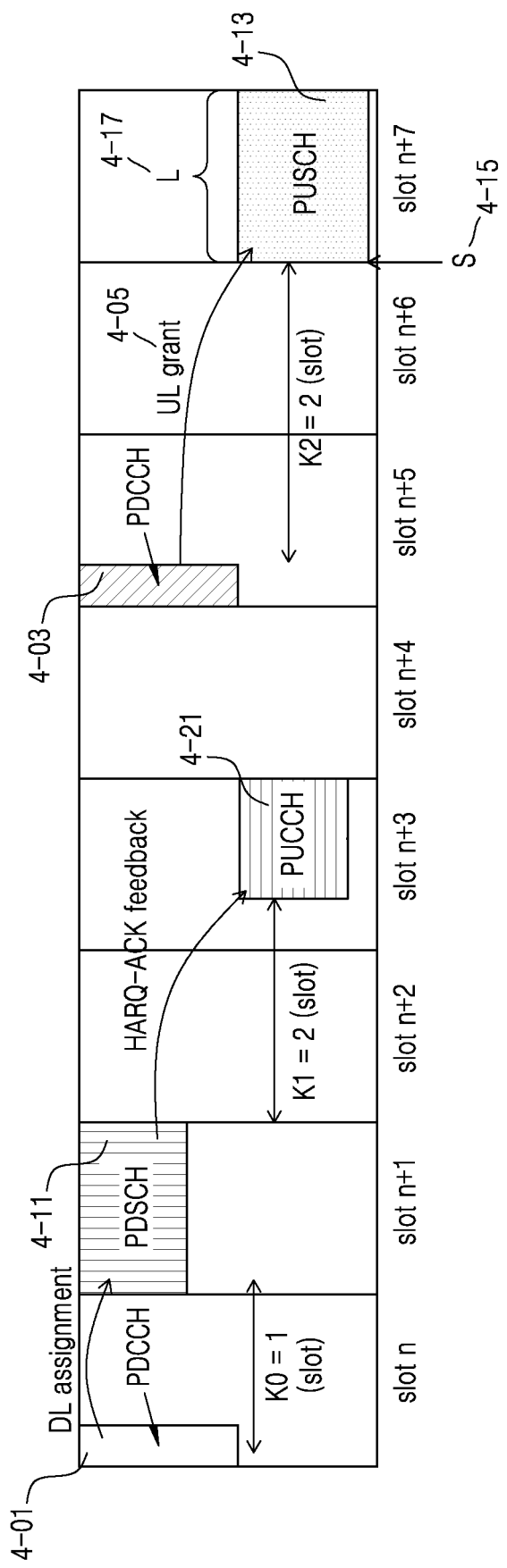
FIG. 4 is a diagram illustrating an example of control information and data transmission timing in an NR system, according to some embodiments of the present disclosure.

FIG. 4 is a diagram illustrating an example; of scheduling timing and processing time according to some embodiments. In PDCCH 4-01 transmitted in slot n, PDSCH 4-11 transmitted in a next slot may be scheduled. When the difference between a slot index in which the PDCCH scheduling the PDSCH is transmitted and a slot index in which the PDSCH is transmitted is K0, K0==1 in the case of FIG. 4. Moreover, HARQ-ACK feedback for the PDSCH may be transmitted on PUCCH 4-21 in slot n+3. When the difference between a slot index in which the PDSCH is transmitted and a slot index in which the PUCCH including HARQ-ACK information of the PDSCH is transmitted is K1, K1=2 in the case of FIG. 4. Also, PDCCH 4-03 may be transmitted in slot n+5, and the PDCCH 4-03 may include information for scheduling PUSCH 4-13 transmitted in slot n+7. When the difference between a slot index in which the PDCCH scheduling the PUSCH is transmitted and a slot index in which the PUSCH is transmitted is K2, K2=2 in the case of FIG. 4. Also, an example in which the slot of the PUSCH in slot n+7 starts at the first symbol and has a length of 14 symbols is illustrated, and in the case of FIG. 4, a start symbol position S (4-15) may be 0, a length L (4-17) may be 14, information about the start symbol position and the length may be transmitted to the terminal through PDCCH 4-03. The time difference from the time when transmission of PDCCH 4-03 ends to the time when transmission of PUSCH 4-13 starts may be greater than or may be greater than or equal to the minimum processing time required for the terminal or the sum of the minimum processing time and the timing advanced value.

Figure 5:
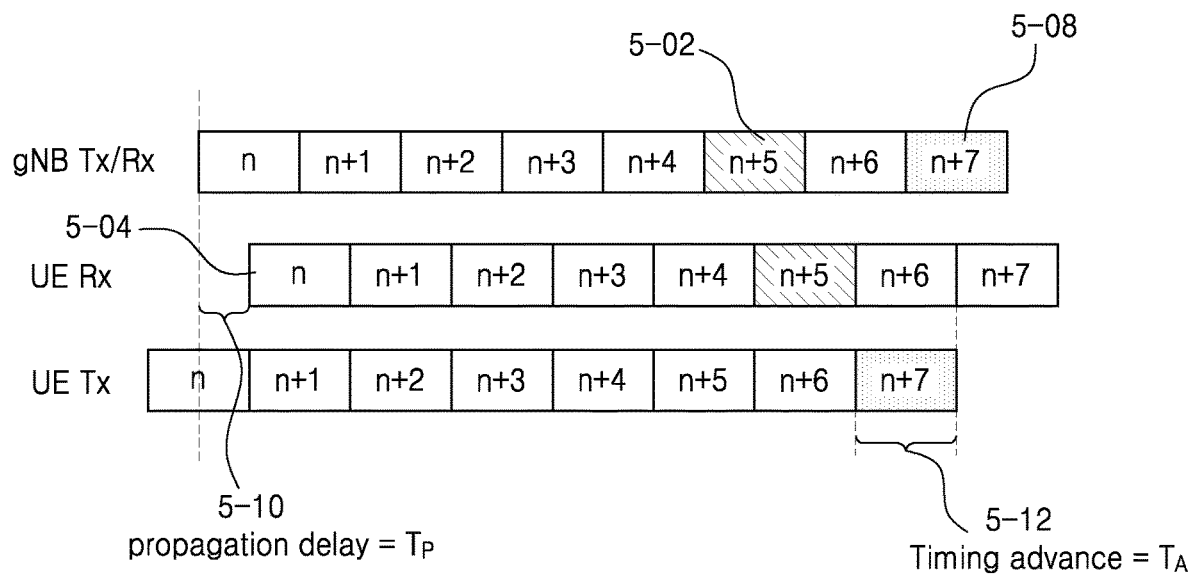
FIG. 5 is a diagram illustrating an example of timing advance in an NR system, according to some embodiments of the present disclosure.

FIG. 5 is a diagram for describing timing advance. When the base station transmits the PDCCH in slot n+5 (5-02), there may be an additional delay time for transmission to the terminal (5-10). The delay lime may be equal to or greater than the radio wave transmission time. Moreover, when the terminal performs uplink transmission, it may be necessary to match the time for transmission to the base station with those for other terminals by additionally considering a delay time 5-10. Thus, the terminal should perform uplink transmission by configuring a reference time that is earlier than the reference time of a slot received by itself in the downlink. In the above, advancing the timing in order to transmit at a reference time earlier than a downlink reference may be referred to as timing advance (5-12). The amount of timing to be advanced for the timing advance may be adjusted by transmission from the base station to the terminal.

Hereinafter, in the present disclosure, a case where a default CORESET is located at the foremost portion of the slot or a case where a CORESET exists from the first symbol in the slot may mean a case where the position of a start symbol of the CORESET including the PDCCH scheduling the PUSCH is the first symbol of the slot or a case where it starts from a certain value or less. In the above, the certain value or less may be a fixed value. For example, it may be a case where the CORESET is located within the first two symbols of the slot.

Hereinafter, in the present disclosure, a case where a default CORESET is located in the middle of the slot or a case where a CORESET exists from the seventh symbol in the slot may mean a case where the position of a start symbol of the CORESET including the PDCCH scheduling the PUSCH is the seventh symbol of the slot or a case where it starts from a certain value or more. In the above, the certain value or more may be a fixed value. For example, it may be a case where the CORESET is not located within the first two symbols of the slot.

Embodiment 1

Embodiment 1 provides a method and apparatus for configuring a HARQ-ACK codebook based on the capability of the terminal. More particularly, a method and apparatus for configuring an HARQ-ACK codebook according to how many PDSCHs for unicasting the terminal may receive in one slot will be described with reference to FIGS. 6 and 7.

The base station may configure one component carrier (CC) or a plurality of component carriers for downlink transmission to the terminal. Also, downlink transmission and uplink transmission slots and symbols may be configured in each CC. Moreover, when PDSCH that is downlink data is scheduled, information of slot timing to which the PDSCH is mapped in a particular bit field of the DCI, information about the position of a start symbol to which the PDSCH is mapped in the slot, and information about the number of symbols to which the PDSCH is mapped may be transmitted. For example, when DCI is transmitted in slot n and PDSCH is scheduled, when K0 that is information of slot timing through which the PDSCH is transmitted indicates 0, a start symbol position is 0, and a symbol length is 7, the PDSCH may be mapped and transmitted in 7 symbols from the $0^{th}$ symbol of slot n. As for time domain resource configuration, the base station and the terminal may understand possible values for the start symbol and length information in a particular slot through a table, and the base station may transmit a time domain resource to the terminal by indicating an index value in a table for possible values for the start symbol and length information to which the PDSCH is mapped in a particular slot. A table for possible values for the start symbol and length information to which the PDSCH is mapped in a particular slot may use a fixed value or may use a configured value when it is configured by upper-level signaling. Table 5 below may be an example of the table including the slot information to which the PDSCH is mapped, the start symbol information, and the symbol number or length information.

TABLE 5

| Row index | dmrs-TypeA- Position | PDSCH mapping type | $K_Q$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 1 | 2 | 4 |
| 15 | 2, 3 | Type B | 0 | 4 | 7 |
| 16 | 2, 3 | Type B | 0 | 8 | 4 |

According to Table 5, up to 3 PDSCHs may be allocated to one slot.

Figure 6:
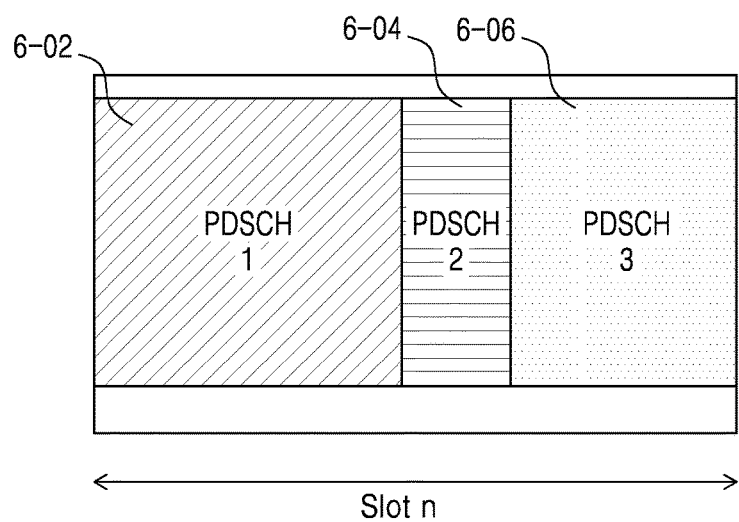
FIG. 6 is a diagram illustrating an example in which three physical downlink shared channels (PDSCHs) are mapped and transmitted in one slot in an NR system, according to some embodiments of the present disclosure.

FIG. 6 is a diagram illustrating an example in which three PDSCHs 6-02, 6-04, and 6-06 are mapped and transmitted in one slot, according to some embodiments of the present disclosure. The three PDSCHs 6-02.6-04, and 6-06 may be transmitted to one terminal or may be transmitted to different terminals respectively. The base station may transmit the start symbol position and length information of each PDSCH to the terminal as a combination of upper-level signaling and DCI. In the present disclosure, the length of the PDSCH or PUSCH may refer to the number of OFDM symbols to which the PDSCH or PUSCH is mapped.

Also, a PDSCH that is a downlink data signal may be transmitted, and HARQ-ACK feedback may be transmitted from the terminal to the base station after a K1 slot. K1 information that is timing information for transmitting the HARQ-ACK may be transmitted in the DCI, and a candidate set of K1 possible values may be transmitted through upper-level signaling and it may be determined as one of them in the DCI.

The terminal may collect and transmit HARQ-ACK feedback bits in order to transmit HARQ-ACK information to the base station. Hereinafter, the collected HARQ-ACK feedback bits may be interchangeably referred to as the HARQ-ACK codebook. Regardless of whether the PDSCH is actually transmitted, the base station may configure a semi-static HARQ-ACK codebook to the terminal such that HARQ-ACK feedback bits corresponding to the PDSCH to be transmitted at a slot and symbol position of a predetermined timing may be transmitted to the terminal. Alternatively, a dynamic HARQ-ACK codebook may be configured to transmit only HARQ-ACK feedback bits corresponding to the actual PDSCH transmission, and in this case, the terminal may determine a feedback bit depending on a counter downlink assignment index (DAI) or a total DAI included in the DCI.

When the terminal is configured with a semi-static HARQ-ACK codebook, a feedback bit to be transmitted may be determined by a table including slot information to which the PDSCH is mapped, start symbol information, and/or symbol number or length information, and K1 candidate values that are HARQ-ACK feedback timing information for the PDSCH. A table including configuration information about the PDSCH such as slot information to which the PDSCH is mapped, start symbol information, and/or symbol number or length information may have a default value, and there may also be a table that the base station may configure to the terminal. Also, the K1 candidate values that are HARQ-ACK feedback timing information for the PDSCH may be determined as default values, for example, {1,2,3,4,5,6,7,8}, and the base station may configure a set of K1 candidate values. For example, the set of K1 candidate values may be configured as {2,4,6,8,10,12, 14,16}, and one of these values may be indicated by the DCI.

When a set of PDSCH reception candidate cases in a serving cell c is $M_{A,c}$, $M_{A,c}$ may be obtained through the following [pseudo-code 1] operations.

[Start of Pseudo-Code 1]
Operation 1: Initialize j to 0 and $M_{A,c}$ to an empty set. Initialize an HARQ-ACK transmission timing index k to 0.
Operation 2: Configure R as a set of rows in a table including slot information to which the PDSCH is mapped, start symbol information, and/or symbol number or length information. Delete the corresponding row from R when a possible PDSCH mapping symbol indicated by each value of R is configured as a UL symbol according to the DL and UL configurations configured at the upper level.
Operation 3-1: Add k to the set $M_{A,c}$ when the terminal may receive one unicast PDSCH in one slot and R is not an empty set.
Operation 3-2: Count the number of PDSCHs that may be allocated to different symbols in the calculated. R and add the corresponding number to $M_{A,c}$ when the terminal may receive more than one unicast PDSCH in one slot.
Operation 4: Restart from Operation 2 by increasing k by 1.
[End of Pseudo-Code 1]

Figure 7:
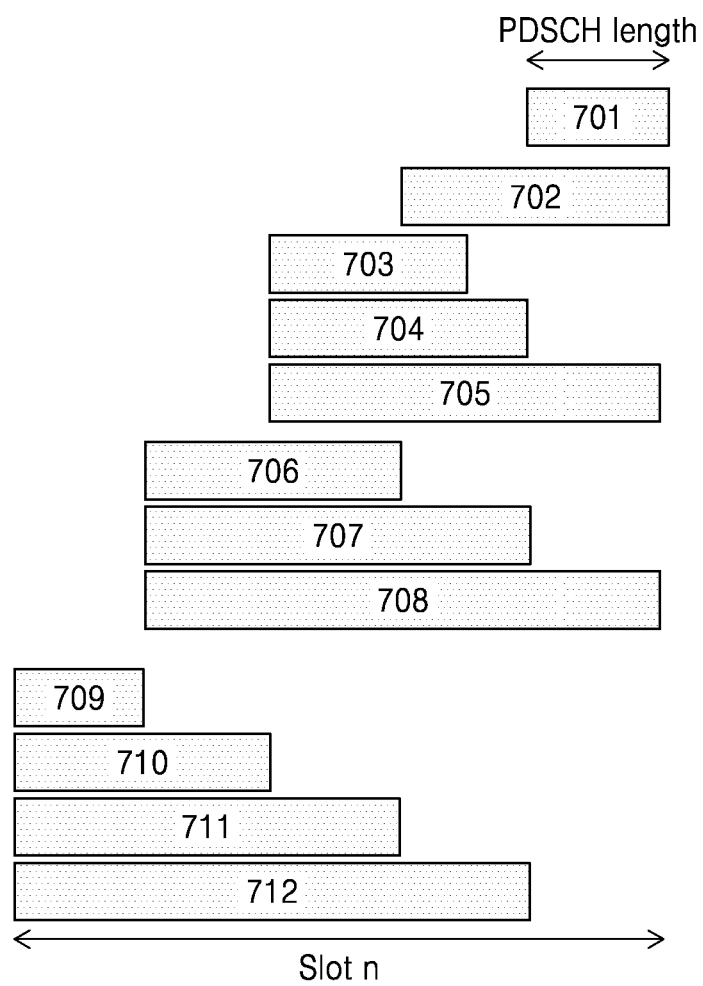
FIG. 7 is a diagram illustrating an example in which a PDSCH reception candidate position in one slot is configured by upper-level signaling in an NR system, according to some embodiments of the present disclosure.

FIG. 7 is a diagram illustrating an example of symbol mapping of a PDSCH which may be scheduled in one slot configured by upper-level signaling. It is a diagram illustrating a case where 12 possible PDSCH mapping positions from 701 to 712 are configured by upper-level signaling. In the configuration illustrated in FIG. 7, when $M_{A,c}$ is generated as a set of PDSCH reception candidate cases according to [pseudo-code 1], PDSCH reception candidate cases at the positions 709, 705, and 702 may be included in $M_{A,c}$. Thus, the size of $M_{A,c}$ may be 3.

The above operation may be performed through [pseudo-code 2] below.

---

[Start of pseudo-code.2]
For the set of slot timing values $K_l$, the UE determines $M_{A,C}$
occasions for candidate PDSCH receptions or SPS PDSCH
releases according to the following pseudo-code.
Set j = 0 - index of occasion for candidate.PDSCH reception of
SPS PDSCH release
Set B = Ø
Set $M_{A,C}$ = Ø
Set C($K_l$) to the cardinality of set $K_l$
Set k = 0 - index of slot timing values $K_{l,k}$ in set $K_l$ for serving cell c
while k < C($K_l$)
  Set R to the set of rows provided by PDSCH-
  TimeDomainResourceAllocation
  Set C(R) to the cardinality of R.
  Set r = 0 - index of row provided by PDSCH-
  TimeDomainResourceAllocation
  if slot n is after a slot for an active DL BWP change on serving cell c
  or an active UL BWP change on the PCell and
  slot n- $K_{l,k}$ is before the slot for the active DL BWP change on serving
  cell c or the active UL BWP change on the PCell
    k = k + 1;
  else
    while r < C(R)
      if the UE is provided higher layer parameter tdd-UL-DL-
      ConfigurationCommon, or higher layer parameter tdd-UL-
      DL-ConfigurationCommon2, or higher layer parameter tdd-UL-
      DL-ConfigDedicated and, for each slot from slot n
      - $K_{l,k}$ - $N_{PDSCR}^{repeat}$ + 1 to slot n - $K_{l,k}$ at least one OFDM symbol
      of the PDSCH time resource derived by row r is
      configured as UL where $K_{l,k}$ is the k-th slot timing value in set $K_l$,
        R = R \ r ;
      end if
      r = r + 1;
    end while
    If the UE does not indicate a capability to receive more than one
    unicast PDSCH per slot and R = Ø,
      $M_{A,C}$ = $M_{A,C}$ Y k;
      The UE does not expect to receive SPS PDSCH release and unicast
      PDSCH in a same slot;
    else
      Set C(R) to the cardinality of R
      Set m to the smallest last OFDM symbol index, as determined by
      the SLIV, among all rows of R
      While R ≠ Ø
        Set r = 0
          while r < C(R)
            if S ≤ m for start OFDM symbol index S for row r
              $b_{r,k}$ = j: - index of occasion for candidate PDSCH reception of
              SPS PDSCH release associated with row r
              R = R \ r;
              B = B Y $b_{r,k}$
            end if
            r = r + 1;
          end while
          $M_{A,C}$ = $M_{A,C}$ Y j:
          j = j + 1;
          Set m to the smallest last OFDM symbol index among
          all rows of R;
        end while
      end if
      k = k + 1;
    end if
  end while
[End of pseudo-code 2]

---

[pseudo-code 1] and [pseudo-code 2] may transmit a greater number of pieces of HARQ-ACK information than the number of unicast PDSCHs that the terminal may actually receive in one slot. For example, when a particular terminal has the capability to receive only two unicast PDSCHs in one slot, when it has a PDSCH symbol allocation table as illustrated in Table 2, even when it may receive two PDSCHs, the terminal should transmit HARQ-ACK feedback bits of 3 bits per slot. Because this method may reduce the coverage of an uplink physical channel, a method of restricting the number of feedback bits according to the number of unicast PDSCHs per slot that the terminal may receive may be used. For this purpose, [pseudo-code 1] and [pseudo-code 2] may be respectively replaced with [pseudo-code 3] and [pseudo-code 4] below.

When a set of PDSCH reception candidate cases in a serving cell c is $M_{A,c}$, $M_{A,c}$ may be obtained according to the PDSCH reception capability of the terminal through the following [pseudo-code 3] operations.

[Start of Pseudo-Code 3]

Operation 1: initialize j to 0 and $M_{A,c}$ to an empty set. Initialize an HARQ-ACK transmission timing index k to 0.

Operation 2: Configure R as a set of rows in a table including slot information to which the PDSCH is mapped, start symbol information, and/or symbol number or length information. Delete the corresponding row from R when a possible PDSCH mapping symbol indicated by each value of R is configured as a UL symbol according to the DL and UL configurations configured at the upper level.

Operation 3-1: Add k to the set $M_{A,c}$ when the terminal may receive one unicast PDSCH in one slot and R is not an empty set.

Operation 3-2: Count the number of PDSCHs that may be allocated to different symbols in the calculated R and add the greater value among the corresponding number and the number of PDSCHs for unicasting that the terminal may receive per slot, to $M_{A,c}$ when the terminal may receive more than one unicast PDSCH in one slot.

Operation 4: Restart from Operation 2 by increasing k by 1.

[End of Pseudo-Code 3]

For example, the above operation may be performed through [pseudo-code 4] below. In the following, N_maxPDSCHperslot may refer to the number of unicast PDSCHs that the terminal may receive in one slot.

---

[Start of pseudo-code 4]
For the set of slot timing values $K_l$, the UE determines $M_{A,C}$ occasions
for candidate.PDSCH receptions or SPS PDSCH
releases according to the following pseudo-code.
Set j = 0 - index of occasion for candidate PDSCH reception or
SPS PDSCH release
Set B = Ø
Set $M_{A,C}$ = Ø
Set C($K_l$) to the cardinality of set $K_l$
Set k = 0 - index of slot timing values $K_{l,k}$ in set $K_l$ for serving cell c
while k < C($K_l$)
  Set R to the set of rows provided by PDSCH-
  TimeDomainResourceAllocation
  Set C(R) to the cardinality of R,
  Set r = 0 - index of row provided by PDSCH-
  TimeDomainResourceAllocation
  if slot n is after a slot for an active DL BWP change on serving cell c
  or an active UL BWP change on the PCell and
  slot n- $K_{l,k}$ is before the slot for the active DL BWP change on serving
  cell e or the active UL BWP change on the PCell
    k = k + 1;
  else
    while r < C(R)
      if the UE is provided higher layer parameter:tdd-UL-DL-
      ConfigurationCommon, or higher layer parameter tdd-UL-
      DL-Configuration Common2, or higher layer parameter tdd-UL-DL-
      ConfigDedicated and, for each slot from slot n
      - $K_{l,k}$ - $N_{PDSCH}^{repeat}$ + 1 to slot n - $K_{l,k}$ at least one OFDM symbol of
      the PDSCH time resource derived by row r is
      configured as UL where $K_{l,k}$ is the k-th slot timing value in set $K_l$,

```
    R = R \ r ;
    end if .
    r = r + 1;
  end while
  If the UE does not indicate a capability to receive more than one
  unicast PDSCH per slot and R ≠ ∅,
    M_{A,C} = M_{A,C} Y k;
    The UE does not expect to receive SPS PDSCH release and unicast
    PDSCH in a same slot;
  else
    Set C(R) to the cardinality of R
    Set m to the smallest last OFDM symbol index, as determined by
    the SLIV, among all rows of R
    Set i = 0 (to count the number of PDSCHs in the given slot)
    While R ≠ ∅ and i < N_maxPDSCHperslot, which is given
    by UE capabilities.
      Set r = 0
      while r < C(R)
        if S ≤ m for start OFDM symbol index S for row r
          b_{r,k} = j; - index of occasion for candidate PDSCH reception or
          SPS PDSCH release associated with row r
          R = R \ r;
          B = B Y b_{r,k}
        end if
        r = r + 1;
      end while
      M_{A,C} = M_{A,C} Y j;
      j = j = 1; i = i = 1;
      Set m to the smallest last OFDM symbol index among
      all rows of R;
    end while
  end if
  k = k + 1;
  end if
end while
[End of pseudo-code 4]
```

[pseudo-code 3] and [pseudo-code 4] may be partially changed to apply a method of calculating the number of HARQ-ACK feedback bits based on the number of unicast PDSCHs that the terminal may receive per slot.

Embodiment 2

Embodiment 2 provides another method and apparatus for configuring a HARQ-ACK codebook based on the capability of the terminal. More particularly, a method and apparatus for generating, by the terminal, HARQ-ACK feedback bits after valid HARQ-ACK information according to how many PDSCHs for unicasting the terminal may receive in one slot are provided.

The terminal may transmit information about how many unicast PDSCHs may be received and processed in one slot, to the base station. For example, among 1, 2, 4, and 7, a value that the terminal may process in one slot may be transmitted to the base station in the form of UE capability.

In downlink data transmission, the terminal may calculate the maximum number of schedulable PDSCHs for the time domain resource allocation of PDSCH scheduling as in [pseudo-code 1] of Embodiment 1. For example, according to Table 2, up to 3 PDSCHs may be allocated to one slot. As another example, up to 7 PDSCHs may be scheduled in one slot according to the configuration of a PDSCH resource allocation table to the terminal by the base station. In this case, when the terminal may receive only up to 2 unicast PDSCHs in one slot, and when up to 7 PDSCHs may be scheduled in one slot according to the upper-level configuration, the terminal should generate 7 HARQ-ACK feedback bits per slot. However, in this case, the terminal may unconditionally generate 5 bits other than the first 2 bits as a NACK to generate a HARQ-ACK codebook.

Embodiment 3

Figure 8:
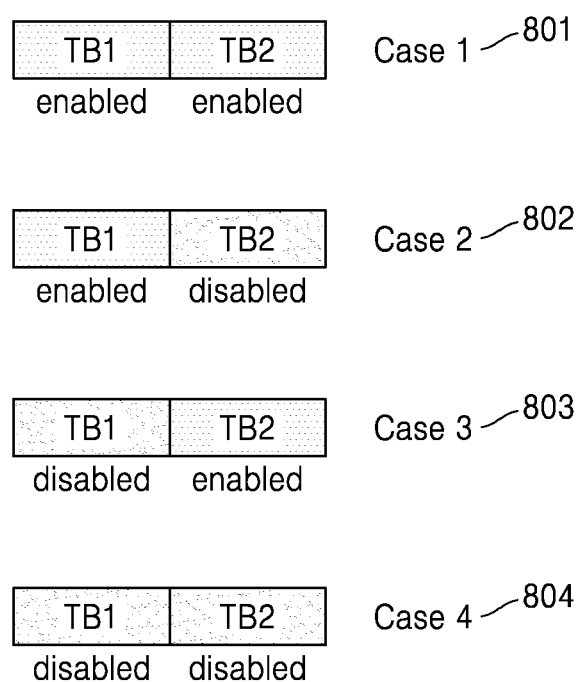
FIG. 8 is a diagram illustrating whether to transmit transport blocks (TBs) that may be transmitted when two TBs are transmitted in one PDSCH in an NR system, according to some embodiments of the present disclosure.

With reference to FIG. 8, Embodiment 3 describes a method and apparatus for generating and receiving HARQ-ACK information of each TB when it is configured such that two TBs may be transmitted in one PDSCH.

In order to transmit two TBs to which each MCS is applied in one PDSCH transmission, resource allocation of each TB and interpretation of the MCS may be required in scheduling DCI. That is, the following bit field per TB may need to be indicated in the scheduling DCI.

Frequency domain resource allocation: Indicates the RB of the frequency domain allocated for data transmission. The represented resource is determined according to the system bandwidth and the resource allocation method.

HARQ process number: Indicates the process number of HARQ.

TB1: Modulation and coding scheme (MCS): Indicates the modulation scheme and coding rate used for data transmission. That is, it may be possible to indicate a coding rate value capable of informing TBS and channel coding information together with information about whether it is QPSK, 16QAM, 64QAM, or 256QAM.

TB1: New data indicator (NM: indicates whether it is HARQ initial transmission or retransmission.

TB1: Redundancy version (RV): Indicates the redundancy version of HARQ.

TB2: Modulation and coding scheme (MCS): indicates the modulation scheme and coding rate used for data transmission. That is, it may be possible to indicate a coding rate value capable of informing TBS and channel coding information together with information about whether it is QPSK, 16QAM, 64QAM, or 256QAM.

TB2: New data indicator (NDI): indicates whether it is HARQ initial transmission or retransmission.

TB2: Redundancy version (RV): Indicates the redundancy version of HARQ.

As described above, MCS, NDI, and RV may be indicated for each TB, but resource allocation and HARQ process ID may be indicated in common for two TBs.

The DCI format may be a format used in 2 TB transmission using multi-antenna technology in the conventional LTE or NR, and resource allocation in 2 TB transmission in one PDSCH in the conventional LTE or NR may be mapped and transmitted in the same frequency and time domain resource.

In the NR system, when an MCS index #26 and an RV index #1 are indicated and scheduled, the corresponding TB may be regarded as disabled. Other combinations of the MCS index and the RV index may be regarded as transmission of the corresponding TB (enabled). FIG. 8 is a diagram illustrating a combination of possible TB transmissions when two TBs are configured to be transmitted in one PDSCH in an NR system. Case 1 may be a case where both TB1 and TB2 are enabled, and Case 2 may be a case where only TB1 is enabled and TB2 is disabled. Case 3 may be case where only TB2 is enabled and TB1 is disabled, and Case 4 may be a case where both TB1 and TB2 are disabled.

When two TBs are configured to be scheduled in one PDSCH by upper-level signaling, when the terminal receives the corresponding DCI format and receives the scheduled PDSCH, the terminal may configure or generate an HARQ-ACK of the disabled TB as a NACK value in generating an HARQ-ACK feedback bit of the corresponding PDSCH. (With DCI 1_1, when the UE receives a PDSCH with one TB, the HARQ-ACK information is associated with the enabled TB and the UE generates MACK for the disabled TB.) DCI 1:1 may be a DCI format that may be used to schedule the PDSCH including two TBs when two TBs are configured to be scheduled in one PDSCH by upper-level signaling. Alternatively, the terminal may determine an HARQ-ACK of the disabled TB according to whether spatial bundling is configured as an upper level. In the present disclosure, "spatial bundling" may mean enabling HARQ-ACK feedback for two TBs to be I bit. For example, when spatial bundling is not configured, the HARQ-ACK of the disabled TB may be a NACK, and when spatial bundling is configured, the HARQ-ACK of the disabled TB may be an ACK. (The UE generates a NACK for the disabled transport block if higher layer parameter HARQ-ACK-SpatialBundlingPUCCH is not provided and generates HARQ-ACK information with value of ACK for the disabled transport block if higher layer parameter HARQ-ACK-SpatialBundlingPUCCH is provided.)

As described above, in the present disclosure, in the case of configuring an HARQ-ACK codebook that is a bundle of HARQ-ACK feedback bits, it may be configured by considering the number of PDSCHs that one terminal may receive in a slot. This may be to prevent unnecessary transmission of more HARQ-ACK feedback bits than the number of received PDSCHs by considering the capability of the terminal.

Embodiment 4

Embodiment 4 describes a method of calculating a minimum processing time required for the terminal to receive a PDSCH and transmit an HARQ-ACK and a method and apparatus for calculating a minimum processing time required for the terminal to receive an UL grant and transmit a PUSCH.

In the 5G or NR system, when the base station transmits the PDSCH including downlink data, a K1 value that is a value corresponding to timing information for transmitting HARQ-ACK information of the PDSCH by the terminal may be indicated in the DCI scheduling the PDSCH. When it is not indicated to be transmitted before the symbol $L_1$ including the timing advance, the terminal may transmit HARQ-ACK information to the base station. That is, the HARQ-ACK information may be transmitted from the terminal to the base station at a time point equal to or later than the symbol $L_1$ including the timing advance. When it is indicated to be transmitted before the symbol $L_1$ including the timing advance, HARQ-ACK information may not be valid HARQ-ACK information in HARQ-ACK transmission from the terminal to the base station. Thus, the base station may need to determine and indicate the $K_1$ value to the terminal such that the terminal may transmit the HARQ-ACK feedback after the calculated minimum processing time. The symbol $L_1$ may be the first symbol where a cyclic prefix (CP) starts after $T_{proc,1}$ from the last time point of the PDSCH. $T_{proc,1}$ may be calculated as Equation 1 below.

$$T_{proc,1}((N_1+d_{1,1}+d_{1,2})(2048+144)\cdot \kappa 2^{-\mu})\cdot T_c \qquad [\text{Equation 1}]$$

In Equation 1, $N_1$, $d_{1,1}$, $d_{1,2}$, k, µ, and Tc may be defined as below.

When the terminal is configured with a plurality of active component carriers or carriers, the maximum timing difference between the carriers may be reflected in second signal transmission.

In the case of a PDSCH mapping type A, that is, in a case where the first DMRS symbol position is the third or fourth symbol of the slot, when an position index i of the last symbol of the PDSCH is less than 7, it is defined as $d_{1,2}=7-i$.

In the case of a PDSCH mapping type B, that is, in a case where the first DMRS symbol position is the first symbol of the PDSCH, when the length of the PDSCH is 4 symbols, $d_{1,2}=3$, and when the length of the PDSCH is 2 symbols, $d_{1,2}=3+d$ and d is the number of symbols where the PDSCH and the PDCCH including a control signal for scheduling the PDSCH overlap each other.

$N_1$ may be defined according to µ as in Table 6 below. µ=0, 1, 2, and 3 may mean subcarrier spacing of 15 kHz, 30 kHz, 60 kHz, and 120 kHz respectively.

TABLE 6

| | PDSCH decoding time $N_I$ [symbols] | |
|---|---|---|
| µ | dmrs-AdditionalPosition = pos0 in DMRS-DownlinkConfig in both of dmrs-DownlinkForPDSCH-MappingTypeA, dmrs-DownlinkForPDSCH-MappingTypeB or when additional DMRS is not configured | dmrs-AdditionalPosition ≠ pos0 in DMRS-DownlinkConfig in either of dmrs-DownlinkForPDSCH-MappingTypeA, dmrs-DownlinkForPDSCH-Mapping TypeB or when additional DMRS is not configured |
| 0 | 8 | 13 |
| 1 | 10 | 13 |
| 2 | 17 | 20 |
| 3 | 20 | 24 |

The $N_1$ value provided in Table 6 may be replaced with an $N_1$ value provided in Table 7 below according to UE capability.

$$T_c=1/(\Delta f_{max}\cdot N_f), \Delta f_{max}=480\cdot 10^3 \text{ Hz}, N_f=4096, \kappa= T_s/T_c=64, T_s=1/(\Delta f_{ref}\cdot N_{f,ref}), \Delta f_{ref}= 15\cdot 10^3 \text{ Hz}, N_{f,ref}=2048$$

Also, each of the above parameters may be defined as above.

TABLE 7

| | PDSCH decoding time $N_I$ [symbols] | |
|---|---|---|
| µ | dmrs-AdditionalPosition = pos0 in DMRS-DownlinkConfig in both of dmrs-DownlinkForPDSCH-MappingTypeA, dmrs-DownlinkForPDSCH-MappingTypeB or when additional DMRS is not configured. | dmrs-AdditionalPosition ≠ pos0 in DMRS-DownlinkConfig in either of dmrs-DownlinkForPDSCH-MappingTypeA, dmrs-DownlinkForPDSCH-MappingTypeB or when additional DMRS is not configured |
| 0 | 3 | 13 |
| 1 | 4.5 | 13 |
| 2 | 9 for frequency range 1 | 20 |

The values of the above tables are merely examples and may be replaced with other values. In the present disclosure, the capability of the terminal according to Table 6 may be referred to as UE processing capability 1, and the capability of the terminal according to Table 7 may be referred to as UE processing capability 2. The terminal may transmit, to the base station, information about whether the terminal itself supports UE processing capability 2 when connected to the base station.

In Equation 1, $d_{1,1}$ may be determined through the same process as [pseudo-code 5] below.

[Start of Pseudo-Code 5]

In a case Where the UE supports UE processing capability 1, $d_{1,1}=0$ when the HARQ-ACK information is transmitted through the PUCCH (uplink control channel), and $d_{1,1}=1$ when the HARQ-ACK information is transmitted through the PUSCH (uplink shared channel, data channel).

In a case where the UE supports UE processing capability 2, $d_{1,1}=0$ when the HARQ-ACK information is included and other UCI information is not included and it is transmitted through the PUCCH, $d_{1,1}=1$ when the HARQ-ACK information is included and other UCI information is not included and it is transmitted through the PUSCH, $d_{1,1}=1$ when the HARQ-ACK information and other UCI information are transmitted together through the PUCCH, and $d_{1,1}=2$ when the HARQ-ACID information and other UCI information are transmitted together through the PUSCH.

[End of Pseudo-Code 5]

Because the method according to [pseudo-code 5] has a short processing time of UE processing capability 2, additional processing tune may be required when UCI other than the HARQ-ACK should also be transmitted. [pseudo-code 5] may be applied by changing a particular value as in [pseudo-code 5a] or [pseudo-code 5b] below.

[Start of Pseudo-Code 5a]

In a case where the UE supports HE processing capability 1, $d_{1,1}=0$ when the HARQ-ACK information is transmitted through the PUCCH (uplink control channel), and $d_{1,1}=1$ when the HARQ-ACK information is transmitted through the PUSCH (uplink shared channel, data channel).

In a case where the UE supports UE processing capability 2, $d_{1,1}=0$ when the HARQ-ACK information is included and other UCI information is not included and it is transmitted through the PUCCH, $d_{1,1}=1$ when the HARQ-ACK information is included and other UCI information is not included and it is transmitted through the PUSCH, $d_{1,1}=4$ when the HARQ-ACK information and other UCI information are transmitted together through the PUCCH, and $d_{1,1}=5$ when the HARQ-ACK information and other UCI information are transmitted together through the PUSCH.

[End of Pseudo-Code 5a]

[Start of Pseudo-Code 5b]

In a case where the UE supports UE processing capability 1, $d_{1,1}=0$ when the HARQ-ACK information is transmitted through the PUCCH (uplink control channel), and $d_{1,1}=1$ when the HARQ-ACK information is transmitted through the PUSCH (uplink shared channel, data channel).

In a case where the UE supports HE processing capability 2, $d_{1,1}=0$ when the HARQ-ACK information is included and other UCI information is not included and it is transmitted through the PUCCH, $d_{1,1}=1$ when the HARQ-ACK information is included and other UCI information is not included and it is transmitted through the PUSCH, $d_{1,1}=3$ when the HARQ-ACK information and other UCI information are transmitted together through the PUCCH, and $d_{1,1}=4$ when the HARQ-ACK information and other UCI information are transmitted together through the PDSCH.

[End of Pseudo-Code 5b]

Moreover, in Equation 1, $d_{1,2}$ may be determined through the same process as [pseudo-code 6] below.

[Start of Pseudo-Code 6]

In the case of following UE processing capability 1, in the case of the PDSCH mapping type B, $d_{1,2}=3$ when the number of PDSCH symbols is 4, $d_{1,2}=6$ when the number of PDSCH symbols is 2 and the first two symbols among the three symbols of the PDCCH and the PDSCH are simultaneously received, and $d_{1,2}=3+d$ when the number of PDSCH symbols is 2 and the number of symbols received simultaneously with the PDCCH symbol is d.

[End of Pseudo-Code 6]

The above method may be to further increase the minimum processing time for HARQ-ACK transmission because the reception of the PDCCH ends later than the reception of the PDSCH when the number of PDSCH symbols is 2 and the first two symbols among the three symbols of the PDCCH and the PDSCH are simultaneously received.

[pseudo-code 6] may be replaced with [pseudo-code 6a] below.

[Start of Pseudo-Code 6a]

In the case of following UE processing capability 1, in the case of the PDSCH mapping type B, $d_{1,2}=3$ when the number of PDSCH symbols is 4, $d_{1,2}=3+d$ when the number of PDSCH symbols is 2, d=3 when the number of PDSCH symbols is 2 and the first two symbols among the three symbols of the PDCCH and the PDSCH are simultaneously received, and it is defined as the number of symbols where the PDSCH and the PDCCH overlap each other in other cases.

[End of Pseudo-Code 6a]

Moreover, when two or more component carriers (CCs) are configured for downlink transmission to the terminal, the terminal may operate by using UE processing capability 1 even when it has reported the base station that it supports UE processing capability 2.

Also, in the 5G or NR system, when the base station transmits control information including an uplink scheduling grant, the terminal may indicate a $K_2$ value corresponding to timing information for transmitting uplink data or PUSCH.

When it is not indicated to be transmitted before the symbol $L_2$ including the timing advance, the terminal may transmit PUSCH to the base station. That is, the PUSCH may be transmitted from the terminal to the base station at a time point equal to or later than the symbol $L_2$ including the timing advance. When the PUSCH is indicated to be transmitted before the symbol $L_2$ including the timing advance, the terminal may disregard (ignore) the uplink scheduling grant control information from the base station. Thus, the base station may need to determine and indicate resource allocation, such as a slot to which the PUSCH is mapped and a start symbol, such that the PUSCH may be transmitted after the calculated minimum processing time. The symbol $L_2$ may be the first symbol where a cyclic prefix (CP) of the PUSCH symbol to be transmitted starts after $T_{proc,2}$ from the last time point of the PDCCH including the scheduling grant. $T_{proc,2}$ may be calculated as Equation 2 below.

$$T_{proc,2} = \max\{((N_2 + d_{2,1} + d_{2,2})(2048 + 144) \cdot \kappa 2^{-\mu}) \cdot T_c, d_{2,3}\}$$ [Equation 2]

In Equation 2, $N_2$, $d_{2,1}$, $d_{2,2}$, k, µ, and Tc may be defined as below. In the present disclosure, max{a, b} may refer to the greater value among a and b.

$d_{2,1}=0$ when the first symbol among the symbols allocated to the PUSCH includes only DMRS, and $d_{2,1}=1$ in other cases.

When the terminal is configured with a plurality of active component carriers or carriers, the maximum timing difference between the carriers may be reflected in second signal transmission.

$N_2$ may be defined according to N as in Table 8 below.

µ=0, 1, 2, and 3 may mean subcarrier spacing of 15 kHz, 30 kHz, 60 kHz, and 120 kHz respectively.

TABLE 8

| µ | PUSCH preparation time $N_2$ [symbols] |
|---|---|
| 0 | 10 |
| 1 | 12 |
| 2 | 23 |
| 3 | 36 |

The $N_2$ value provided in Table 8 may be replaced with an $N_2$ value provided in Table 9 below according to UE capability.

$T_c = 1/(\Delta f_{max} \cdot N_F)$, $\Delta f_{max} = 480 \cdot 10^3$ Hz, $N_F = 4096$, $\kappa = T_s/T_c = 64$, $T_s = 1/(\Delta f_{ref} \cdot N_{f,ref})$, $\Delta f_{ref} = 15 \cdot 10^3$ Hz, $N_{f,ref} = 2048$ Also, each of the above parameters may be defined as above.

TABLE 9

| µ | PUSCH preparation time M [symbols] |
|---|---|
| 0 | 5 |
| 1 | 5.5 |
| 2 | 11 for frequency range 1 |

Moreover, the 5G or NR system may configure a bandwidth part (BWP) within one carrier to designate a particular terminal to transmit and receive within the configured BWP. This may be to reduce the power consumption of the terminal. The base station may configure a plurality of BWPs and may change an activated BWP in control information. When the BWP is changed, the time that the terminal may use may be defined as in Table 10 below.

TABLE 10

| Frequency Range | Scenario | Type 1 delay (us) | Type 2 delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 10, Frequency Range 1 may refer to a frequency band of 6 GHz or less and Frequency Range 2 may refer to a frequency band of 6 GHz or more; however, this may be modified and applied. In the above embodiments, Type 1 and Type 2 may be determined according to UE capability. In the above embodiments, Scenarios 1, 2, 3, and 4 may be given as in Table 11 below.

TABLE 11

|  | Center frequency changed | Center frequency unchanged |
|---|---|---|
| Frequency bandwidth changed | Scenario 3 | Scenario 2 |
| Frequency bandwidth unchanged | Scenario 1 | Scenario 4 when subcarrier spacing is changed |

In the present disclosure, that a BWP change request exists in control information or a BWP change is triggered may mean that BWP information indicated by a bandwidth part (BWP) indicator is different from a currently activated BWP and thus that the BWP is changed. Conversely, when the same BWP as the currently activated BWP is indicated, there may be no BWP change request.

In Equation 2, $d_{2,2}$ may be determined through the same process as [pseudo-code 7] below.

[Start of Pseudo-Code 7]

In a case where the UE supports UE processing capability 1, $d_{2,2}=1$ when the HARQ-ACK information is multiplexed and transmitted in the PUSCH (uplink shared channel, data channel), and $d_{2,2}=0$ in other cases.

In a case where the UE supports UE processing capability 2, $d_{2,2}=1$ when the HARQ-ACK information is included and other UCI information is not included and it is multiplexed and transmitted in the PUSCH, $d_{2,2}=2$ when the HARQ-ACK information and other UCI information are multiplexed and transmitted together in the PUSCH, and $d_{2,2}=0$ in other cases.

[End of Pseudo-Code 7]

Because the method according to [pseudo-code 7] has a short processing time of UE processing capability 2, additional processing time may be required when UCI other than the HARQ-ACK should also be transmitted. [pseudo-code 7] may be applied by changing a particular value as in [pseudo-code 7a] or [pseudo-code 7h] below.

[Start of Pseudo-Code 7a]

in a case where the UE supports UE processing capability 1, $d_{2,2}=1$ when the HARQ-ACK information is multiplexed and transmitted in the PUSCH (uplink shared channel, data channel), and $d_{2,2}=0$ in other cases.

In a case where the UE supports UE processing capability 2, $d_{2,2}=4$ when the HARQ-ACK information is included and other UCI information is not included and it is multiplexed and transmitted in the PUSCH, $d_{2,2}=5$ when the HARM-ACK information and other UCI information are multiplexed and transmitted together in the PUSCH, and $d_{2,2}=0$ in other cases.

[End of Pseudo-Code 7a]

[Start of Pseudo-Code 7b]
In a case where the UE supports UE processing capability 1,
$d_{2,2}=1$ when the HARQ-ACK information is multiplexed and transmitted in the PUSCH (uplink shared channel, data channel), and $d_{2,2}=0$ in other cases.
In a case where the UE supports UE processing capability 2,
$d_{2,2}=3$ when the HARQ-ACK information is included and other UCI information is not included and it is multiplexed and transmitted in the PUSCH,
$d_{2,2}=4$ when the HARQ-ACK information and other UCI information are multiplexed and transmitted together in the PUSCH, and
$d_{2,2}=0$ in other cases.
[End of Pseudo-Code 7b]
[pseudo-code 7] may be modified and applied as in [pseudo-code 7c] below.
[Start of Pseudo-Code 7c]
In a case where the UE supports UE processing capability 1.
$d_{2,2}=1$ when the HARQ-ACK information is multiplexed and transmitted in the PUSCH (uplink shared channel, data channel), and $d_{2,2}=0$ in other cases.
In a case where the UE supports UE processing capability 2,
when the HARQ-ACK information or other UCI information is included and multiplexed in the PUSCH or two or more component carriers (CCs) are configured for downlink transmission to the terminal, the terminal may operate by using UE processing capability 1 even when it has reported the base station that it supports UE processing capability 2.
[End of Pseudo-Code 7c]

Moreover, when two or more component carriers (CCs) are configured for uplink transmission to the terminal, the terminal may operate by using UE processing capability 1 even when it has reported the base station that it supports UE processing capability 2.

As another example, when the terminal has reported the base station that it supports UE processing capability 2, when UCI such as HARQ-ACK and RI/CQI to be transmitted is transmitted at the time when the PUSCH is transmitted, a method of not transmitting and dropping the above HARQ-ACK feedback, the UCI, or the like may be used.

That is, according to some embodiments of the present disclosure, in a wireless communication system, the terminal may obtain capability information for processing time of the terminal; determine whether control information to be transmitted in uplink includes only HARQ-ACK or further includes other UCI; obtain information about the number of CCs configured to the terminal; obtain mapping information of PDCCH and PDSCH transmitted to the terminal; and calculate a minimum processing time based on at least one of the determined information.

That is, according to some embodiments of the present disclosure described above, the terminal may transmit information about the processing capability of the terminal to the base station, determine whether control information to be transmitted in uplink includes at least one of HARQ-ACK and UCI, obtain information about the number of component carriers (CCs) configured from the base station, obtain mapping information of PDCCH and PDSCH transmitted from the base station, calculate a minimum processing time for uplink transmission based on at least one of the information about the number of CCs and the mapping information, as a result of determining whether the control information to be transmitted in uplink includes at least one of the HARQ-ACK and the UCI, and generate a HARQ-ACK feedback bit.

Also, according to some embodiments of the present disclosure described above, the base station may obtain information about the processing capability of the terminal, determine whether control information to be transmitted in uplink includes at least one of HARQ-ACK and UCI, obtain information about the number of component carriers (CCs) configured to the terminal, obtain mapping information of PDCCH and PDSCH transmitted to the terminal, calculate a minimum processing time for uplink transmission based on at least one of the information about the number of CCs and the mapping information, as a result of determining whether the control information to be transmitted in uplink includes at least one of the HARQ-ACK and the UCI, and determine an HARQ-ACK feedback transmission timing according to the determined minimum processing time.

Embodiment 5

Embodiment 5 describes a method of determining the power of PUSCH when the terminal transmits the PUSCH for uplink data transmission, particularly when it intends to transmit based on a code block group.

The present embodiment intends to describe the operations of the base station and the terminal in the above code block group (CBG)-based retransmission method. In the present disclosure, terms of CB group-based retransmission, CBG-based retransmission, partial retransmission, and CBG retransmission may be interchangeably used.

In determining the power for PUSCH transmission, the base station and the terminal may determine the power for PUSCH transmission, in consideration of an actual data rate; however, a case where CB group (CBG)-based retransmission is configured should be considered in determining the number of coded bits of the UCI, in consideration of the number of bits of CBs of the TB transmitted on the PUSCH.

In a wireless communication system, when data is transmitted, transmission may be performed in units of transport blocks (TBs). The TB may be divided into several code blocks (CBs), and channel coding may be performed in units of CBs. When retransmission is performed after initial transmission, the retransmission may be performed in units of TBs, and even when only one CB fails to be decoded, the entire TB should be retransmitted. Thus, there may be a case where the CB or CB group-based retransmission is required, and the new radio (NR) system may provide a method of performing CB group-based retransmission.

A CRC may be added to the last or first portion of one transport block (TB) to be transmitted in uplink or downlink. The CRC may have 16 bits or 24 bits or a predetermined number of bits or may have a variable number of bits according to the channel conditions or the like and may be used to determine whether channel coding is successful. The block to which the TB and the CRC are added may be divided into several code blocks (CBs). The maximum size of the code block may be predetermined and divided, and in this case, the last code block may be smaller in size than other code blocks, or 0, a random value, or 1 may be inserted to match with the length of other code blocks. CRCs may be added to each of the code blocks. The CRC may have 16 bits or 24 bits or a predetermined number of bits and may be used to determine whether channel coding is successful. However, this is merely an embodiment, and according to other embodiments, the CRCs added to the TB and the CRCs added to the code block may be omitted depending on the type of a channel code to be applied to the code block. For example, when an LDPC code rather than a turbo code is applied to code blocks, CRCs to be inserted to each code block may be omitted. However, even when LDPC is applied, CRCs may be added to the code block as they are. Also, even when a polar code is used, a CRC may be added or omitted.

The maximum length of one code block may be determined according to the type of channel coding applied to a TB to be transmitted, and the TB and the CRC added to the TB may be divided into code blocks according to the maximum length of the code block. In the LTE system, a CB CRC may be added to each CB, and the data bit and CRC of the CB may be encoded with a channel code, and thus coded bits may be determined.

The number of CBGs configured from the base station to the terminal or the maximum number of configured CBGs will be described as N_{CBG,max}. N_{CBG,max} may be used interchangeably with $N_{CBG,max}$. Also, the number of CBs included in a scheduled TB will be described as C. When the TB is scheduled, the actual number M of CBGs may be determined as M=min($N_{CBG,max}$, C) and min(x,y) may represent the smaller value among x and y. The CBs of C included in the TB may be grouped according to the following rule to form M CBGs. In the present disclosure, CBG-related upper-level configuration may be information about the maximum number of CBGs in the case of CBG-based retransmission. Also, CBG-related information in scheduling information may be CBGTI.

The first mod(C, M) CBGs may each include ceil(C/M) or $\lfloor C/M \rfloor$ CBs.

The last M-mod(C, M) CBGs may each include floor(C/M) or $\lfloor C/M \rfloor$ CBs.

In the above, ceil(C/M) or $\lfloor C/M \rfloor$ may represent a minimum integer that is not smaller than C/M, and floor(C/M) or $\lfloor C/M \rfloor$ may represent a maximum integer that is not greater than C/M. For example, when C/M is 4.3, ceil(C/M) may be 5 and floor(C/M) may be 4. According to the above rule, CBs may be sequentially grouped from the previous CBG.

As described above, when the maximum number of CBGs configured to the terminal is $N_{CBG,max}$, downlink control information (DCI) transmitted to schedule CBG-based retransmission may be configured to include $N_{CBG,max}$ bits for CBG transmission information (CBGTI). This may be an indicator indicating which CBGs are being transmitted in the current scheduling. For example, when the base station configures $N_{CBG,max}$=4 to the terminal, one TB may include up to 4 CBGs, DCI may include 4 bits for CBGTI, and each bit may indicate information about whether each CBG is being transmitted. For example, in the case of 1111 in DCI, when there are 4 CBGs, because each bit is 1, it may mean that all the CBGs are transmitted. As another example, in the case of 1100 in DCI, when there are 4 CBGs, it may mean that only the first and second CBGs are transmitted.

The terminal may calculate the power for PUSCH transmission as in Equation 3 below.

Each of the parameters in Equation 3 may be defined as below.

$P_{CMAX,f,c}(i)$ may be the maximum transmission power of the terminal configured for a PUSCH transmission occasion i in a carrier f of a serving cell c.

$P_{O\_PUSCH,f,c}(j)$ and $\alpha_{b,f,c}(j)$ may be based on values configured as an upper level.

$$M_{RB,b,f,c}^{PUSCH}(i)$$

may represent a frequency band allocated for PUSCH.

$PL_{b,f,c}(q_d)$ may be an estimation of a downlink path loss value. It may be a value determined in dB.

In the above, as for Ks=1.25, it may be determined as $$\Delta_{TF,b,f,c}(i) = 10\log_{10}\left(\left(2^{BPRE \cdot K_s} - 1\right) \cdot \beta_{offset}^{PUSCH}\right),$$

and when Ks=0, it may be determined as $\Delta_{TF,b,f,c}(i)=0$, and Ks may be determined based on a value configured as an upper level. Also, when the number of PUSCHs is transmitted in more than one layer, it may be $\Delta_{TF,b,f,c}(i)=0$.

In the above, BPRE may be a parameter for calculating transmission power based on an actual data rate when the PUSCH is transmitted.

In the case of the PUSCH where data (i.e., UL-SCH) is transmitted, BPRE may be determined based on $$BPRE = \sum_{r=0}^{C-1} K_r/N_{RE}$$

and in the above, when CBGTI information is in downlink control information (DCI) and it is indicated by CBGTI such that the $r^{th}$ code block of the TB transmitted in the PUSCH may not be transmitted, Kr=0, and in other cases, Kr is the size of the $r^{th}$ code block included in the TB transmitted in the PUSCH. In the above, $N_{RE}$ may be a value representing the amount of resources to which the PUSCH is mapped, but may be modified and applied.

In the above, when BPRE is calculated without considering a CBGTI value (i.e., when Kr is defined as the size of the $r^{th}$ codeblock in any case), BPRE may be calculated as a completely different value that does not match with the actual data rate when the PUSCH is transmitted, and in this case, there may be a problem in that the transmission power may be calculated differently than intended.

That is, according to embodiments of the present disclosure described above, in a wireless communication system, the terminal may obtain configuration information about CBG-based retransmission including at least one of information about the number of CBGs configured to the terminal and the maximum number of CBGs, receive scheduling information for uplink transmission from the base station, obtain information about the currently-transmitted CBG (e.g., CBGTI) from uplink scheduling information, and

[Equation 3]

$$P_{PUSCH,b,f,c}(i, j, q_d, l) = \min\begin{cases} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{cases}$$

determine the transmission power for uplink transmission by calculating the power for PUSCH transmission based on at least one of the configuration information about CBG-based retransmission, the scheduling information, and the information about the currently-transmitted CBG.

Also, according to embodiments of the present disclosure described above, in a wireless communication system, the base station may obtain configuration information about CBG-based retransmission configured to the terminal, obtain information about the CBG currently transmitted to the terminal, transmit scheduling information including the information about the currently-transmitted CBG to the terminal, and calculate the power for PUSCH transmission based on at least one of the configuration information about CBG-based retransmission, the scheduling information, and the information about the currently-transmitted CBG.

Figure 9:
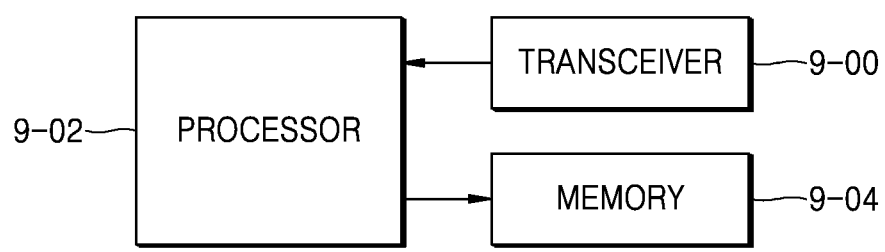
FIG. 9 is a diagram illustrating an internal structure of a terminal according to some embodiments of the present disclosure.
Figure 10:
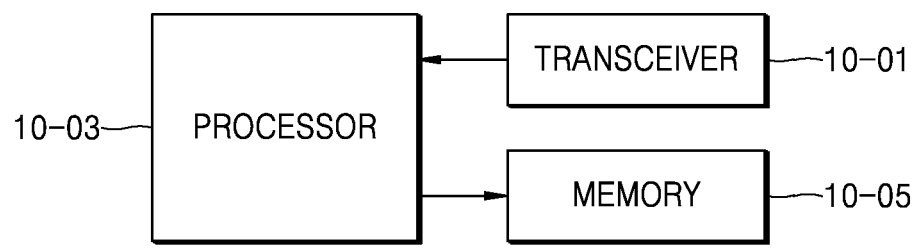
FIG. 10 is a diagram illustrating an internal structure of a base station according to some embodiments of the present disclosure.

In order to perform the above embodiments of the present disclosure, a transceiver, a processor, and a memory of each of the terminal and the base station are illustrated in each of FIGS. 9 and 10. In order to determine the number of HARQ-ACK bits in Embodiment 1 and perform a HARQ-ACK feedback transmission/reception operation according thereto, transmission/reception methods of the base station and the terminal may be provided, and in order to perform this, a receiver, a processor, and a transmitter of each of the base station and the terminal may operate according to the embodiments.

Particularly, FIG. 9 is a block diagram illustrating an internal structure of a terminal according to some embodiments of the present disclosure. As illustrated in FIG. 9, a terminal of the present disclosure may include a transceiver 9-00, a memory 9-04, and a processor 9-02. However, the present disclosure is not limited thereto, and the terminal may include fewer or more components than the components illustrated in FIG. 9.

The transceiver 9-00 may exchange signals with the base station. The signals exchanged with the base station may include control information and data. The transceiver 9-00 may include, for example, an RF transmitter for upconverting and amplifying a transmitted signal and an RF receiver for low-noise-amplifying and downconverting a received signal. However, the configuration of the transceiver 9-00 is not limited thereto. Also, the transceiver 9-00 may receive a signal through a radio channel and output the signal to the processor 9-02 and may transmit a signal output from the processor 9-02, through a radio channel. The processor 9-02 may control a series of processes such that the terminal may operate according to the above embodiments of the present disclosure. For example, the transceiver 9-00 may receive upper-level signaling configuration and scheduling information from the base station, and the processor 9-02 may determine the number of HARQ-ACK bits according to the upper-level signaled PDSCH reception candidate position and the terminal capability and perform transmission preparation accordingly. Thereafter, the HARQ-ACK feedback determined according to the upper-level signaled PDSCH reception candidate position and the terminal capability may be transmitted from the transceiver 9-00 to the base station. Also, the processor 9-02 may control the components of the terminal to calculate a minimum processing time for HARQ-ACK feedback or uplink transmission and determine power in uplink transmission.

The memory 9-04 may store data such as a basic program, an application program, or configuration information for an operation of the terminal. The memory 9-04 may provide the stored data at the request of the processor 9-02. The memory 9-04 may include a storage medium or a combination of storage media such as ROM, RAM, hard disk, CD-ROM, and DVD. Also, the memory 9-04 may include a plurality of memories. The memory 9-04 may store a program for performing the above method.

The processor 9-02 may control overall operations of the terminal. For example, the processor 9-02 may transmit and receive data through the transceiver 9-00. Also, the processor 9-02 may write/read data into/from the memory 9-04. For this purpose, the processor 9-02 may include a communication processor (CP) for performing control for communication and an application processor (AP) for controlling an upper layer such as an application program. According to embodiments of the present disclosure, the processor 9-02 may control the terminal to perform the above procedure. Also, at least one component in the terminal may be implemented as one chip.

FIG. 10 is a block diagram illustrating an internal structure of a base station according to some embodiments of the present disclosure. As illustrated in FIG. 10, a base station of the present disclosure may include a transceiver 10-01, a memory 10-05, and a processor 10-03. The transceiver 10-01 may exchange signals with the terminal. The signals exchanged with the terminal may include control information and data. For this purpose, the transceiver 10-01 may include, for example, an RF transmitter for up-converting and amplifying a transmitted signal and an RF receiver for low-noise-amplifying and down-converting a received signal. However, the configuration of the transceiver 10-01 is not limited thereto. Also, the transceiver 10-01 may receive a signal through a radio channel and output the signal to the processor 10-03 and may transmit a signal output from the processor 10-03, through a radio channel. The processor 10-03 may control a series of processes such that the base station may operate according to the above embodiments of the present disclosure. For example, the processor 10-03 may determine the number of HARQ-ACK bits according to the PDSCH reception candidate position configuration. Thereafter, the transceiver 10-01 may transmit configuration information related to the number of HARQ-ACK bits, and the transceiver 10-01 may receive the determined number of HARQ-ACK feedback bits. Also, the processor 10-03 may control the components of the base station to calculate a minimum processing time for HARQ-ACK feedback or uplink transmission and determine power in uplink transmission.

The memory 10-05 may store data such as a basic program, an application program, or configuration information for an operation of the base station. The memory 10-05 may provide the stored data at the request of the processor 10-03. The memory 10-05 may include a storage medium or a combination of storage media such as ROM, RAM, hard disk, CD-ROM, and DVD. Also, the memory 10-05 may include a plurality of memories. Also, the memory 10-05 may store a program for performing the above method.

The processor 10-03 may control overall operations of the base station. For example, the processor 10-03 may transmit and receive data through the transceiver 10-01. Also, the processor 10-03 may write/read data into/from the memory 10-05. For this purpose, the processor 10-03 may include a communication processor (CP) for performing control for communication and an application processor (AP) for controlling an upper layer such as an application program. According to embodiments of the present disclosure, the processor 10-03 may control the base station to perform the above procedure. Also, at least one component in the base station may be implemented as one chip.

The methods according to the embodiments of the present disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the present disclosure described in the specification or the claims.

These programs (software modules or software) may be stored in random access memories (RAMS), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored in a memory including a combination of some or all of such storage devices. Also, each of the memories may include a plurality of memories.

Also, the programs may be stored in an attachable storage device that may be accessed through a communication network such as Internet, Intranet, local area network (LAN), wide LAN (WLAN), or storage area network (SAN), or through a communication network including any combination thereof. Such a storage device may be connected through an external port to an apparatus performing an embodiment of the present disclosure. Also, a separate storage device on a communication network may be connected to an apparatus performing an embodiment of the present disclosure.

In particular embodiments of the present disclosure described above, the components included in the present disclosure are expressed in the singular or plural according to the particular embodiments of the present disclosure. However, the singular or plural expressions are selected suitably according to the presented situations for convenience of description, the present disclosure is not limited to the singular or plural components, and the components expressed in the plural may even be configured in the singular or the components expressed in the singular may even be configured in the plural.

It should be understood that the embodiments of the present disclosure described herein should be considered in a descriptive sense only and not tier purposes of limitation. That is, it will be understood by those of ordinary skill in the art that various changes in form and details may be made in the embodiments of the present disclosure without departing from the scope of the present disclosure. Also, the embodiments of the present disclosure may be operated in combination when necessary. Also, as for the above embodiments, other modifications based on the technical concept of the above embodiments may be implemented in LTE systems, 5G systems, or the like.

The invention claimed is:

1. A method performed by a user equipment (UE), the method comprising:
    transmitting, to a base station (BS), capability information indicating a number of physical data shared channel (PDSCH) reception in a slot;
    receiving at least one PDSCH scheduled based on the capability information;
    obtaining at least one hybrid automatic repeat request-acknowledgment (HARQ-ACK) feedback bit for each of the at least one PDSCH; and
    transmitting a HARQ-ACK codebook including the at least one HARQ-ACK feedback bit for each of the at least one PDSCH.

2. The method of claim 1, wherein the at least one PDSCH is received on at least one symbol configured based on higher layer signaling without a corresponding physical downlink control channel (PDCCH).

3. The method of claim 1, further comprising:
    transmitting UE processing capability information indicating whether the UE supports processing capability 2 for PDSCH, in case that a number of carriers for downlink transmission is larger than configured number of carriers; and
    receiving downlink control information (DCI) including information indicating HARQ-ACK timing determined based on the UE processing capability information, wherein in case that a number of carriers for downlink transmission is larger than configured number of carriers, the HARQ-ACK timing is determined according to UE processing capability 1, based on the UE processing capability information.

4. The method of claim 1, further comprising:
    transmitting UE processing capability information indicating whether the UE supports processing capability 2 for physical uplink shared channel (PUSCH), in case that a number of carriers for uplink transmission is larger than configured number of carriers; and
    receiving DCI including information scheduling the PUSCH determined based on the UE processing capability information, wherein in case that a number of carriers for the uplink transmission is larger than configured number of carriers, the information scheduling the PUSCH is determined according to UE processing capability 1, based on the UE processing capability information.

5. The method of claim 1, further comprising:
    receiving code block group transmission information (CBGTI) for PUSCH transmission;
    based on the CBGTI, identifying a minimum number of code block groups (CBGs) for the PUSCH transmission among a maximum number of CBGs per transport block configured from the BS and a number of code blocks in PUSCH; and
    determining transmission power for the PUSCH, based on the minimum number of CBGs.

6. A method performed by a base station, the method comprising:
    receiving, from a user equipment (UE), capability information indicating a number of physical data shared channel (PDSCH) reception in a slot;
    transmitting at least one PDSCH scheduled based on the capability information, wherein at least one hybrid automatic repeat request-acknowledgment (HARQ-ACK) feedback bit for each of the at least one PDSCH is obtained at the UE; and
    receiving HARQ-ACK codebook including the at least one HARQ-ACK feedback bit for each of the at least one PDSCH.

7. The method of claim 6, wherein the transmitting of at least one PDSCH comprises:
    transmitting the at least one PDSCH on at least one symbol configured based on higher layer signaling without a corresponding physical downlink control channel (PDCCH).

8. The method of claim 6, further comprising:
receiving UE processing capability information indicating whether the UE supports processing capability 2 for PDSCH, in case that a number of carriers for downlink transmission is larger than configured number of carriers; and
transmitting downlink control information (DCI) including information indicating HARQ-ACK timing determined based on the UE processing capability information, wherein in case that a number of carriers for downlink transmission is larger than configured number of carriers, the HARQ-ACK timing is determined according to UE processing capability 1, based on the UE processing capability information.

9. The method of claim 6, further comprising:
receiving UE processing capability information indicating whether the UE supports processing capability 2 for physical uplink shared channel (PUSCH), in case that a number of carriers for uplink transmission is larger than configured number of carriers; and
transmitting DCI including information scheduling the PUSCH determined based on the UE processing capability information, wherein in case that a number of carriers for the uplink transmission is larger than configured number of carriers, the information scheduling the PUSCH is determined according to UE processing capability 1, based on the UE processing capability information.

10. The method of claim 6, further comprising:
transmitting code block group transmission information (CBGTI) for PUSCH transmission,
wherein based on the CBGTI, a minimum number of code block groups (CBGs) for the PUSCH transmission is identified at the UE among a maximum number of CBGs per transport block configured from the BS and a number of code blocks in PUSCH,
wherein transmission power for the PUSCH is determined at the UE, based on the minimum number of CBGs.

11. A terminal user equipment (UE) comprising:
a transceiver; and
at least one processor coupled with the transceiver and configured to:
transmit, to a base station (BS), capability information indicating a number of data shared channel (PDSCH) reception in a slot,
receive at least one PDSCH scheduled based on the capability information,
obtain at least one HARQ-ACK feedback bit for each of the at least one PDSCH, and
transmit HARQ-ACK codebook including the at least one HARQ-ACK feedback bit for each of the at least one PDSCH.

12. The UE of claim 11, wherein the at least one PDSCH is received on at least one symbol configured based on higher layer signaling without a corresponding physical downlink control channel (PDCCH).

13. The UE of claim 11, wherein the at least one processor is further configured to:
transmit UE processing capability information indicating whether the UE supports processing capability 2 for PDSCH, in case that a number of carriers for downlink transmission is larger than configured number of carriers, and
receive downlink control information (DCI) including information indicating HARQ-ACK timing determined based on the UE processing capability information, wherein in case that a number of carriers for downlink transmission is larger than configured number of carriers, the HARQ-ACK timing is determined according to UE processing capability 1, based on the UE processing capability information.

14. The UE of claim 11, wherein the at least one processor is further configured to:
transmit UE processing capability information indicating whether the UE supports processing capability 2 for physical uplink shared channel (PUSCH), in case that a number of carriers for uplink transmission is larger than configured number of carriers, and
receive DCI including information scheduling the PUSCH determined based on the UE processing capability information, wherein in case that a number of carriers for the uplink transmission is larger than configured number of carriers, the information scheduling the PUSCH is determined according to UE processing capability 1, based on the UE processing capability information.

15. The UE of claim 11, wherein the at least one processor is further configured to:
receive code block group transmission information (CBGTI) for PUSCH transmission,
based on the CBGTI, identify a minimum number of code block groups (CBGs) for the PUSCH transmission among a maximum number of CBGs per transport block configured from the BS and a number of code blocks in PUSCH, and
determine transmission power for the PUSCH, based on the minimum number of CBGs.

16. A base station comprising:
a transceiver; and
at least one processor coupled with the transceiver and configured to:
receive, from a user equipment (UE), capability information indicating a number of data shared channel (PDSCH) reception in a slot,
transmit at least one PDSCH scheduled based on the capability information,
wherein at least one HARQ-ACK feedback bit for each of the at least one PDSCH is obtained at the UE,
receive HARQ-ACK codebook including the at least one HARQ-ACK feedback bit for each of the at least one PDSCH.

17. The base station of claim 16, wherein the at least one processor is further configured to transmit the at least one PDSCH on at least one symbol configured based on higher layer signaling without a corresponding physical downlink control channel (PDCCH).

18. The base station of claim 16, wherein the at least one processor is further configured to:
receive UE processing capability information indicating whether the UE supports processing capability 2 for PDSCH, in case that a number of carriers for downlink transmission is larger than configured number of carriers, and
transmit downlink control information (DCI) including information indicating HARQ-ACK timing determined based on the UE processing capability information, wherein in case that a number of carriers for downlink transmission is larger than configured number of carriers, the HARQ-ACK timing is determined according to UE processing capability 1, based on the UE processing capability information.

19. The base station of claim 16, wherein the at least one processor is further configured to:

receive UE processing capability information indicating whether the UE supports processing capability 2 for physical uplink shared channel (PUSCH), in case that a number of carriers for uplink transmission is larger than configured number of carriers, and transmit DCI including information scheduling the PUSCH determined based on the UE processing capability information, wherein in case that a number of carriers for the uplink transmission is larger than configured number of carriers, the information scheduling the PUSCH is determined according to UE processing capability 1, based on the UE processing capability information.

20. The base station of claim 16, wherein the at least one processor is further configured to:

transmit code block group transmission information (CBGTI) for PUSCH transmission, wherein based on the CBGTI, a minimum number of code block groups (CBGs) for the PUSCH transmission is identified at the UE among a maximum number of CBGs per transport block configured from the BS and a number of code blocks in PUSCH, wherein transmission power for the PUSCH is determined at the UE, based on the minimum number of CBGs.

* * * * *